US011177121B2

(12) United States Patent
Thoeing et al.

(10) Patent No.: US 11,177,121 B2
(45) Date of Patent: Nov. 16, 2021

(54) METHOD FOR IDENTIFICATION OF THE MONOISOTOPIC MASS OF SPECIES OF MOLECULES

(71) Applicant: Thermo Fisher Scientific (Bremen) GmbH, Bremen (DE)

(72) Inventors: Christian Thoeing, Blender (DE); Andreas Kuehn, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 16/818,767

(22) Filed: Mar. 13, 2020

(65) Prior Publication Data

US 2020/0211831 A1 Jul. 2, 2020

Related U.S. Application Data

(63) Continuation of application No. 15/698,474, filed on Sep. 7, 2017, now Pat. No. 10,593,530.

(30) Foreign Application Priority Data

Sep. 9, 2016 (EP) .................................... 16188157
Jun. 2, 2017 (EP) .................................... 17174330

(51) Int. Cl.
*G01N 30/72* (2006.01)
*H01J 49/00* (2006.01)

(52) U.S. Cl.
CPC ................................ *H01J 49/0036* (2013.01)

(58) Field of Classification Search
CPC .. H01J 49/0036; H01J 49/004; H01J 49/0045; H01J 49/0081; G01N 30/72
See application file for complete search history.

(56) References Cited

U.S. PATENT DOCUMENTS

| | | | | |
|---|---|---|---|---|
| 5,910,655 | A | 6/1999 | Skilling | |
| 10,593,530 | B2 * | 3/2020 | Thoeing | H01J 49/0036 |

(Continued)

FOREIGN PATENT DOCUMENTS

| | | | |
|---|---|---|---|
| CN | 1773276 | A | 5/2006 |
| CN | 103776891 | A | 5/2014 |

(Continued)

OTHER PUBLICATIONS

Zhang et al., PeakSelect: Preprocessing Tandem Mas Spectra for Better Peptide Identification, 2008, Rapid Communications in Mass Spectrometry, vol. 22, pp. 1203-1212 (Year: 2008).*

(Continued)

*Primary Examiner* — Toan M Le
(74) *Attorney, Agent, or Firm* — David A. Schell

(57) ABSTRACT

A method for identification of the monoisotopic mass or a parameter correlated to the mass of the isotopes of the isotope distribution of at least one species of molecules contained in a sample and/or originated from a sample by at least an ionization process includes measuring a mass spectrum of the sample with a mass spectrometer, dividing at least one range of measured m/z values of the mass spectrum into fractions, assigning at least some of the fractions to one processor of several provided processors, deducing for each of the at least one species of molecules an isotope distribution of their ions having a specific charge z, deducing from at least one deduced isotope distribution the monoisotopic mass or a parameter correlated to the mass of the isotopes of the isotope distribution of the species of molecules.

14 Claims, 1 Drawing Sheet

(56) References Cited

U.S. PATENT DOCUMENTS

| | | | |
|---|---|---|---|
| 2002/0027195 | A1 | 3/2002 | Kato |
| 2005/0255606 | A1 | 11/2005 | Ahmed et al. |
| 2007/0095757 | A1 | 5/2007 | Kaplan et al. |
| 2014/0117219 | A1 | 5/2014 | Kenny |

FOREIGN PATENT DOCUMENTS

| | | | |
|---|---|---|---|
| JP | 2005-283593 | A | 10/2005 |
| JP | 2006-528339 | A | 12/2006 |
| JP | 2007-503001 | A | 2/2007 |
| JP | 2009-257850 | A | 11/2009 |
| JP | 2014-508937 | A | 4/2014 |
| JP | 2016-525677 | A | 8/2016 |
| WO | WO01/67485 | A1 | 9/2001 |
| WO | WO2004/102180 | A2 | 11/2004 |

OTHER PUBLICATIONS

Vyatkina et al., De Novo Sequencing of Peptides from Top-Down Tandem Mass Spectra, Sep. 28, 2015, Journal of Proteome Research, ACS Publications, pp. 4450-4462 (Year: 2015).*

Google Search Results, Dec. 30, 2020, 3 pp. (Year: 2020).*

Google Search Results, Jun. 24, 2021, 1 pp. (Year: 2021).*

Chen et al., "Automated Charge State Determination of Complex Isotope-Resolved Mass Spectra by Peak-Target Fourier Transform", J Am Soc Mass Spectrom 2008, 19, pp. 46-54.

Horn, et al., "Automated Reduction and Interpretation of High Resolution Electrospray Mass Spectra of Large Molecules,"J. Am. Soc. Mass Spectrom., vol. 11, No. 4., (2000), pp. 320-332.

Kaur et al., "Algorithms for Automatic Interpretation of High Resolution Mass Spectra", J Am Soc Mass Spectrom 2006, 17, pp. 459-468.

Liu et al., "Deconvolution and Database Search of Complex Tandem Mass Spectra of Intact Proteins", Molecular & Cellular Proteomics 9.12, pp. 2772-2782.

Reinhold et al., "Electrospray Ionization Mass Spectrometry: Deconvolution by an Entropy-Based Algorithm", J Am Soc Mass Spectrom 1992, 3, pp. 207-215.

Senko et al., "Automated Assignment of Charge States from Resolved Isotopic Peaks for Multiply Charged Ions", J Am Soc Mass Spectrom 1995, 6, pp. 52-56.

Senko et al., "Determination of Monoisotopic Masses and lonPopulations for Large Biomolecules from Resolved Isotopic Distributions", J Am Soc Mass Spectrom 1995, 6, pp. 229-233.

Valkenborg et al., "A Model-Based Method for the Prediction ofthe Isotopic Distribution of Peptides", J Am Soc Mass Spectrom 2008, 19, pp. 703-712.

Zhang et al., "A Universal Algorithm for Fast and Automated Charge State Deconvolution of Electrospray Mass-to-Charge Ratio Spectra", J Am Soc Mass Spectrom 1998, 9, p. 225 233.

Zhang et al., "PeakSelect: Preprocessing Tandem Mass Spectra for Better Peptide Identification", Rapid Commun. Mass Spectrom., 2008 (22), pp. 1203-1212.

* cited by examiner

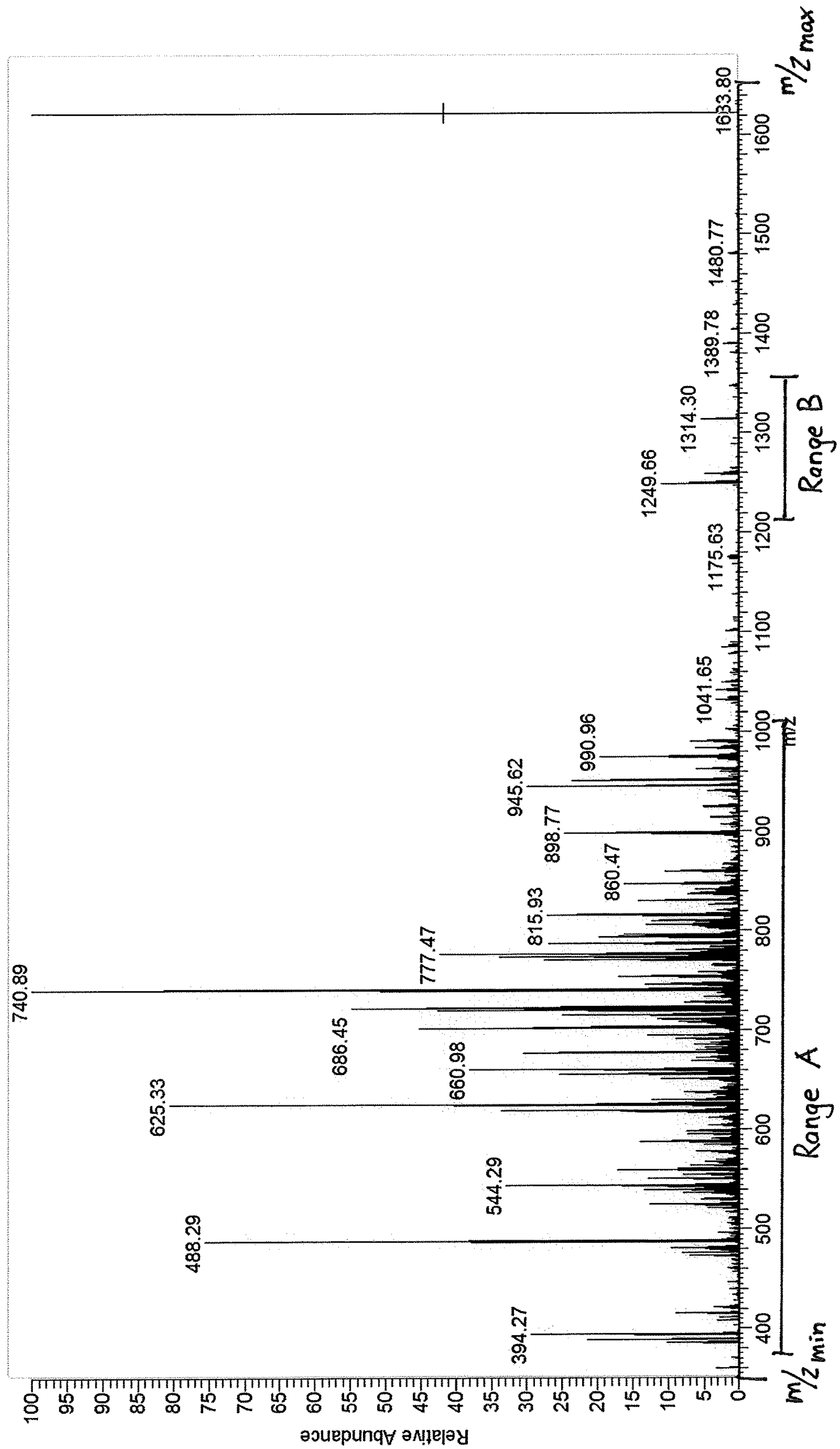
Relative Abundance
100
95
90
85
80
75
70
65
60
55
50
45
40
35
30
25
20
15
10
5
0
m/z
400
500
600
700
800
900
1000
1100
1200
1300
1400
1500
1600
394.27
488.29
544.29
625.33
660.98
686.45
740.89
777.47
815.93
860.47
898.77
945.62
990.96
1041.65
1175.63
1249.66
1314.30
1389.78
1480.77
1633.80
m/z min
Range A
Range B
m/z max

METHOD FOR IDENTIFICATION OF THE MONOISOTOPIC MASS OF SPECIES OF MOLECULES

CROSS-REFERENCE TO RELATED APPLICATIONS

The present application is a continuation under 35 U.S.C. § 120 and claims the priority benefit of co-pending U.S. patent application Ser. No. 15/698,474, filed Sep. 7, 2017. The disclosure of the foregoing application is incorporated herein by reference.

TECHNICAL FILED OF THE INVENTION

The invention belongs to the methods for identification of the monoisotopic mass or a parameter correlated the mass of the isotopes of the isotope distribution of at least one species of molecules. The method is using a mass spectrometer to measure a mass spectrum of a sample. With the method, the monoisotopic mass or a parameter correlated the mass of the isotopes of the isotope distribution can be identified of species of molecules which are contained in the sample investigated by the mass spectrometer or originated from the sample investigated by the mass spectrometer by at least an ionization process. Preferably the ionization process creates the ions analyzed by the mass spectrometer.

BACKGROUND OF THE INVENTION

Methods to identify at least the monoisotopic mass or a parameter correlated the mass of the isotopes of the isotope distribution of one species of molecules, mostly various species of molecules, are in general available. Preferably these methods are used to identify the monoisotopic mass of large molecules like peptides, proteins, nucleic acids, lipids and carbohydrates having typically a mass of between 200 u and 5,000,000 u, preferably between 500 u and 100,000 u and particularly preferably between 5,000 u and 50,000 u.

These methods are used to investigate samples. These samples may contain species of molecules which can be identified by their monoisotopic mass or a parameter correlated the mass of the isotopes of their isotope distribution.

A species of molecules is defined as a class of molecules having the same molecular formula (e.g. water has the molecular formula $H_2O$ and methane the molecular formula $CH_4$.)

Or the investigated sample can be better understood by ions which are generated from the sample by at least an ionization process. The ions may be preferably generated by electrospray ionization (ESI), matrix-assisted laser desorption ionization (MALDI), plasma ionization, electron ionization (EI), chemical ionization (CI) and atmospheric pressure chemical ionization (APCI). The generated ions are charged particles mostly having a molecular geometry and a corresponding molecular formula. In the context of this patent application the term "species of molecules originated from a sample by at least an ionization process" shall be understood is referring to the molecular formula of an ion which is originated from a sample by at least an ionization process. So, monoisotopic mass or a parameter correlated the mass of the isotopes of the isotope distribution of a species of molecules originated from a sample by at least an ionization process can be deduced from the ion which is originated from a sample by at least an ionization process by looking for the molecular formula of the ion after the charge of the ion has been reduced to zero and changing the molecular formula accordingly to the ionization process as described below.

In the species of molecules all molecules have the same composition of atoms according to the molecular formula. But most atoms of the molecule can occur as different isotopes. For example, the basic element of the organic chemistry, the carbon atom occurs in two stable isotopes, the $^{12}C$ isotope with a natural probability of occurrence of 98.9% and the $^{13}C$ isotope (having one more neutron in its atomic nucleus) with a natural probability of occurrence of 1.1%. Due to these probabilities of occurrence of the isotopes particularly complex molecules of higher mass consisting of a higher number of atoms have a lot of isotopomers, in which the atoms of the molecule exist as different isotopes. In the whole context of the patent application these isotopomers of a species of molecule designated as the "isotopes of the species of molecule". These isotopes have different masses resulting in a mass distribution of the isotopes of species of molecules, named in the content of this patent application isotope distribution (short term: ID) of the species of molecules. Each species of molecules therefore can have different masses but for a better understanding and identification of a species of molecules to each molecule is assigned a monoisotopic mass. This is the mass of a molecule when each atom of the molecule exists as the isotope with the lowest mass. For example, a methane molecule has the molecular formula $CH_4$ and hydrogen has the isotopes $^{1}H$ having on a proton in his nucleus and $^{2}H$ (deuterium) having an additional neutron in his nucleus. So, the isotope of the lowest mass of carbon is $^{12}C$ and the isotope of the lowest mass of hydrogen is $^{1}H$. Accordingly the monoisotopic mass of methane is 16 u. But there is a small probability of other methane isotopes having the masses 17 u, 18 u, 19 u, 20 u and 21 u. All these other isotopes belong to the isotope distribution of methane and can be visible in the mass spectrum of a mass spectrometer.

The identification of the monoisotopic mass or a parameter correlated the mass of the isotopes of the isotope distribution of at least one species of molecules is by measuring a mass spectrum of the investigated sample with by a mass spectrometer. In general, every kind of mass spectrometer can be used known to a person skilled in the art to measure a mass spectrum of the sample. In particular, it is preferred to use a mass spectrometer of high resolution like a mass spectrometer having an ORBITRAP™ mass analyzer, a FT-mass spectrometer, an ICR mass spectrometer or an MR-TOF mass spectrometer. Other mass spectrometers for which the inventive method can be applied are particularly TOF mass spectrometer and mass spectrometer with a HR quadrupole mass analyzer. But to identify the monoisotopic mass or a parameter correlated the mass of the isotopes of the isotope distribution of species of molecules if the mass spectrum is measured with a mass spectrometer having a low resolution is difficult with the known method of identification, in particular, because neighboring peaks of isotopes having a mass difference of 1 u cannot be distinguished.

On the one hand, molecules already present in the sample are set free and are only charged by the ionization process e.g. by the reception and/or emission of electrons. The method of the invention is able to assign to these species of molecules contained in the sample its monoisotopic mass due to their ions which are detected in the mass spectrum of the mass spectrometer.

On the other hand, the ionization process can change the molecules contained in the sample by fragmentation to smaller charged particles or addition of atoms or molecules to the molecules contained in the sample resulting in larger molecules which are charged due to the process. Also by an ionization process the matrix of a sample can be split into molecules which are charged. So, all these ions are originated from the sample by a described ionization process. So, for these ions the accordingly species of the molecules originated from the sample have to be investigated by a method for identification of the monoisotopic mass or a parameter correlated the mass of the isotopes of the isotope distribution of at least one species of molecules.

To date, many methods to identify monoisotopic masses of isotopic peaks in mass spectra have been published, including Patterson functions, Fourier transforms, or a combination thereof (M. W. Senko et al., *J. Am. Soc. Mass Spectrom.* 1995, 6, 52; D. M. Horn et al., *J. Am. Soc. Mass Spectrom.* 2000, 11, 320; L. Chen & Y. L. Yap, *J. Am. Soc. Mass Spectrom.* 2008, 19, 46), m/z accuracy scores (Z. Zhang & A. G. Marshall, *J. Am. Soc. Mass Spectrom.* 1998, 9, 225), fits of experimentally observed peak patterns to theoretical models (P. Kaur & P. B. O'Connor, *J. Am. Soc. Mass Spectrom.* 2006, 17, 459; X. Liu et al., *Mol. Cell Proteomics* 2010, 9, 2772), and entropy-based deconvolution algorithms (B. B. Reinhold & V. N. Reinhold, *J. Am. Soc. Mass Spectrom.* 1992, 3, 207). These methods are often targeted at specific applications such as peptides and/or intact proteins, and the reported executing times are in the seconds time range on a 2.2-GHz CPU (Liu et al., 2010), which is not sufficient for an online detection and subsequent selection of species for a further MS analysis, as in standard methods of MS proteomics. An unpublished method of P. Yip et al., has been optimized for the analysis of intact proteins, using a high number of correlations of potentially related peaks, which have been transformed before from the original data to a logarithmic m/z axis with binary intensity information. However, with the speed is not fast enough for the use for a Fourier-transform mass spectrometer. Evidently, a holistic approach, which is not only suitable for a broader range of applications, including peptides, small organic molecules, and intact proteins, but also for a fast online analysis directly after the data acquisition (without delaying the acquisition of subsequent scans), is required for areas of applications where acquisition speed, i.e., the amount of data that can be analyzed experimentally per unit of time, is essential.

SUMMARY OF THE INVENTION

The above mentioned objects are solved by a new method for identification of the monoisotopic mass or a parameter correlated to the mass of the isotopes of the isotope distribution of at least one species of molecules contained in a sample and/or originated from a sample by at least an ionization process according to claim 1.

The inventive method comprising the following steps:

(i) measuring a mass spectrum of the sample with a mass spectrometer (ii) dividing at least one range of measured m/z values of the mass spectrum of the sample into fractions (iii) assigning at least some of the fractions of the at least one range of measured m/z values to one processor of several provided processors (iv) deducing for each of the at least one species of molecules contained in the sample and/or originated from a sample from the measured mass spectrum in at least one of the fractions of the at least one range of measured m/z values an isotope distribution of their ions having a specific charge z and (v) deducing from at least one deduced isotope distribution of the ions of each of the at least one species of molecules contained in the sample and/or originated from the sample the monoisotopic mass or a parameter correlated to the mass of the isotopes of the isotope distribution of the species of molecules.

In an embodiment of the inventive method for identification of the monoisotopic mass or a parameter correlated to the mass of the isotopes of the isotope distribution of at least one species of molecules contained in a sample and/or originated from a sample by at least an ionization process wherein in each of the fractions of at least one range of measured m/z values at least one isotope distribution of ions of one species of molecules having a specific charge z is detected.

In an embodiment of the inventive method for identification of the monoisotopic mass or a parameter correlated to the mass of the isotopes of the isotope distribution of at least one species of molecules contained in a sample and/or originated from a sample by at least an ionization process for at least one other specifies of molecules than the at least one species of molecules a isotope distribution of their ions having a specific charge z is deduced in at least one of the fractions at least one range of measured m/z values.

In an embodiment of the inventive method for identification of the monoisotopic mass or a parameter correlated to the mass of the isotopes of the isotope distribution of at least one species of molecules contained in a sample and/or originated from a sample by at least an ionization process wherein for some of the species of molecules contained in the sample and/or originated from the sample by at least an ionization process the monoisotopic mass or a parameter correlated the mass of the isotopes of the isotope distribution is deduced from two or more deduced isotope distributions of their ions having a different specific charge z.

In an embodiment of the inventive method for identification of the monoisotopic mass or a parameter correlated to the mass of the isotopes of the isotope distribution of at least one species of molecules contained in a sample according and/or originated from a sample by at least an ionization process for some of the species of molecules contained in the sample and/or originated from the sample by at least an ionization process the monoisotopic mass or a parameter correlated to the mass of the isotopes of the isotope distribution is deduced from two or more isotope distributions of their ions having a different specific charge z which are deduced from different fractions of the at least one range of measured m/z values.

In an embodiment of the inventive method for identification of the monoisotopic mass or parameter correlated to the mass of the isotopes of the isotope distribution of at least one species of molecules contained in a sample and/or originated from a sample by at least an ionization process the monoisotopic mass or a parameter correlated the mass of the isotopes of the isotope distribution of each of the at least one species of molecules contained in the sample and/or originated from the sample by at least an ionization process is deduced from at least one deducted isotope distribution of their ions having a specific charge z of the species of molecules in at least one of the fractions of the at least one range of measured m/z values by evaluating the isotope distributions of ions having a specific charge z deduced from different fractions of the at least one range of measured m/z values.

In a preferred embodiment of the inventive method for identification of the monoisotopic mass or a parameter correlated to the mass of the isotopes of the isotope distribution of at least one species of molecules contained in a sample and/or originated from a sample by at least an ionization process the monoisotopic mass or parameter correlated to the mass of the isotopes of the isotope distribution of each of the at least one species of molecules contained in the sample and/or originated from a sample by at least an ionization process is deduced from at least one deduced isotope distribution of their ions having a specific charge z of the species of molecules in at least one of the fractions of the at least one range of measured m/z value by evaluating the isotope distributions of ions having a specific charge z deduced from all fractions assigned to a processor.

In an embodiment of the inventive method for identification of the monoisotopic mass or a parameter correlated to the mass of the isotopes of the isotope distribution of at least one species of molecules contained in a sample for each of the at least one species of molecules contained in the sample and/or originated from the sample by at least an ionization process at least one isotope distribution of their ions having a specific charge z is deduced from the measured mass spectrum by deducing a charge score $cs_{PX}(z)$ of a measured peak PX of the mass spectrum by multiplication of at least three of the four sub charge scores $cs_{P\_PX}(z)$, $cs_{AS\_PX}(z)$, $cs_{AC\_PX}(z)$ and $cs_{IS\_PX}(z)$.

In a preferred embodiment of the inventive method for identification of the monoisotopic mass or a parameter correlated to the mass of the isotopes of the isotope distribution of at least one species of molecules contained in a sample the charge score $cs_{PX}(z)$ of the measured peak PX of the mass spectrum is deduced by multiplication of the four sub charge scores $cs_{P\_PX}(z)$, $cs_{AS\_PX}(z)$, $cs_{AC\_PX}(z)$ and $cs_{IS\_PX}(z)$.

In an embodiment of the inventive method for identification of the monoisotopic mass or a parameter correlated to the mass of the isotopes of the isotope distribution of at least one species of molecules contained in a sample for each of the at least one species of molecules contained in the sample and/or originated from the sample by at least an ionization process at least one isotope distribution of their ions having a specific charge z is deduced from the measured mass spectrum by deducing for each charge state z between the charge 1 and a maximum charge state $z_{max}$ the charge score $cs_{PX}(z)$ of the measured peak PX of the mass spectrum.

In an embodiment of the inventive method for identification of the monoisotopic mass or a parameter correlated to the mass of the isotopes of the isotope distribution of at least one species of molecules contained in a sample and/or originated from a sample by at least an ionization process after the deduction of isotope distributions in step (iv) at least a portion of the deduced isotope distributions are investigated if one or more of their peaks might belong to an isotope distribution of a low resolution charge state $z_{hi}$. Preferably the monoisotopic mass or a parameter correlated to the mass of the isotopes of these isotope distributions of at species of molecules contained in a sample and/or originated from a sample by at least an ionization process is deduced from the isotope distribution of low resolution charge state $z_{hi}$, assigned by the investigation to a peak of a isotope distribution deduced in step (iv).

The above mentioned objects are further solved by a new method for identification of the monoisotopic mass or a parameter correlated to the mass of the isotopes of the isotope distribution of at least one species of molecules contained in a sample and/or originated from a sample by at least an ionization process according to claim 11.

The inventive method comprising the following steps:

(i) measuring a mass spectrum of the sample with a mass spectrometer (ii) deducing for each of the at least one species of molecules contained in the sample and/or originated from the sample by at least an ionization process from the measured mass spectrum at least one isotope distribution of their ions having a specific charge z by deducing a charge score $cs_{PX}(z)$ of a measured peak of the mass spectrum by multiplication of at least three of the four sub charge scores $cs_{P\_PX}(z)$, $cs_{AS\_PX}(z)$, $cs_{AC\_PX}(z)$ and $cs_{IS\_PX}(z)$ and (iii) deducing from at least one deduced isotope distribution of ions having a specific charge z of each of the at least one species of molecules contained in the sample and/or originated from the sample by at least an ionization process the monoisotopic mass or a parameter correlated to the mass of the isotopes of the isotope distribution of the species of molecules.

In a preferred embodiment of the inventive method for identification of the monoisotopic mass or parameter correlated to the mass of the isotopes of the isotope distribution of at least one species of molecules contained in a sample and/or originated from a sample by at least an ionization process wherein the charge score $cs_{PX}(z)$ of a measured peak of the mass spectrum is deduced by multiplication of the four sub charge scores $cs_{P\_PX}(z)$, $cs_{AS\_PX}(z)$, $cs_{AC\_PX}(z)$ and $cs_{IS\_PX}(z)$.

In an embodiment of the inventive method for identification of the monoisotopic mass or a parameter correlated to the mass of the isotopes of the isotope distribution of at least one species of molecules contained in a sample and/or originated from a sample by at least an ionization process after the deduction of isotope distributions in step (ii) at least a portion of the deduced isotope distributions are investigated if one or more of their peaks might belong to an isotope distribution of a low resolution charge state $z_{hi}$. Preferably the monoisotopic mass or a parameter correlated to the mass of the isotopes of these isotope distributions of at species of molecules contained in a sample and/or originated from a sample by at least an ionization process is deduced from the isotope distribution of low resolution charge state $z_{hi}$, assigned by the investigation to a peak of a isotope distribution deduced in step (ii).

The above mentioned objects are further solved by a new method for identification of the monoisotopic mass or a parameter correlated to the mass of the isotopes of the isotope distribution of at least one species of molecules contained in a sample and/or originated from a sample by at least an ionization process according to claim 13.

The inventive method comprising the following steps:

(i) measuring a mass spectrum of the sample with a mass spectrometer (ii) deducing for each of the at least one species of molecules contained in the sample and/or originated from the sample from the measured mass spectrum at least two isotope distributions of their ions having a specific charge z and (iii) deducing from the at least two deduced isotope distribution of the ions of each of the at least one species of molecules contained in the sample and/or originated from the sample the monoisotopic mass or a parameter correlated to the mass of the isotopes of the isotope distribution of the species of molecules.

The inventive method makes use of information from related isotope distributions of a species of molecules, which increases the accuracy of the identification of the monoisotopic mass or a parameter correlated the mass of the isotopes of the isotope distribution of the species of molecules considerably. This is especially advantageous for intact proteins, which tend to form an extensive set of isotope distributions of the ions of a species of molecules with higher charge states due to the ionization. Poorly resolved or completely unresolved IDs (i.e., IDs the isotopic peaks of which are not or only partly resolved) are handled dynamically by determining the maximally resolvable isotope distribution. Due to flexible m/z windows a separation of single IDs is prevented. The implemented charge scores have been optimized for a broad range of applications, including peptides, small organic molecules (including those with uncommon isotopic peak patterns), and intact proteins. Generally, the detection and annotation is not limited to the averaging model for peptides/proteins. In contrast to the methods of the prior art, the inventive method allows assigning multiple isotope distributions to each species of molecules. To enhance the performance of the new method, time consuming procedures such as Fourier transforms are avoided and multi-processing as well as speed-optimized processes are employed wherever possible. The inventive method uses the original intensities of the peaks to better distinguish between adjacent and overlapping IDs, which is particularly important for peptide data and mixtures of peptides and proteins. The new method takes less than 20 milliseconds to process mass spectra of complex protein samples (including the determination of monoisotopic masses) with a signal-to-noise threshold of 10 (meaning that only those peaks above this threshold will be focused for a charge state analysis in the second algorithm). An optional dynamic S/N threshold allows increasing the threshold in peak-dense regions containing multiple adjacent/overlapping IDs in order to limit the running time.

The present invention represents a holistic approach to the determination of monoisotopic masses of peaks or a parameter correlated the mass of the isotopes of the isotope distribution of at least one species of molecules in a mass spectrum, suitable for a broad range of applications/chemical species, but with a focus on intact proteins and multiply charged species bearing high charge states. An essential element is the speed optimization of the method, which ensures its applicability for an online detection within ~20-30 milliseconds of the majority of the species contained in a mass spectrum of a complex protein sample.

The method is capable of handling unresolved isotope distributions, so that even low-resolution spectra of complex protein samples can be used in the inventive method.

BRIEF DESCRIPTION OF THE DRAWING

FIG. 1 shows a mass spectrum and ranges of m/z values investigated by the inventive method.

DETAILED DESCRIPTION OF PREFERRED EMBODIMENTS

The method of invention is used to identify at least the monoisotopic mass of one species of molecules, mostly various species of molecules. Preferably the method is used to identify the monoisotopic mass of large molecules like peptides, proteins, nucleic acids, lipids and carbohydrates having typically a mass of between 200 u and 5,000,000 u, preferably between 500 u and 100,000 u and particularly preferably between 5,000 u and 50,000 u.

The method of the invention is used to investigate samples. These samples may contain species of molecules which can be identified by their monoisotopic mass or a parameter correlated to the mass of the isotopes of their isotope distribution.

In the following the embodiments of the inventive method are only described to identify the monoisotopic mass of species of molecules. Nevertheless, all the described methods can be also used to identify a parameter correlated the mass of the isotopes of the isotope distribution of species of molecules. In particular, this parameter can be the average mass of the isotopes of the isotope distribution of a species of molecules, the mass of the isotope with the highest occurrence in the isotope distribution of a species of molecules and the mass of the centroid of the isotope distribution of a species of molecules.

A species of molecules is defined as a class of molecules having the same molecular formula (e.g. water has the molecular formula $H_2O$ and methane the molecular formula $CH_4$.)

Or the investigated sample can be better understood by ions which are generated from the sample by at least an ionization process. The ions may be preferably generated by electrospray ionization (ESI), matrix-assisted laser desorption ionization (MALDI), plasma ionization, electron ionization (EI), chemical ionization (CI) and atmospheric pressure chemical ionization (APCI). The generated ions are charged particles mostly having a molecular geometry and a corresponding molecular formula. In the context of this patent application the term "species of molecules originated from a sample by at least an ionization process" shall be understood is referring to the molecular formula of an ion which is originated from a sample by at least an ionization process.

So, monoisotopic mass or a parameter correlated to the mass of the isotopes of the isotope distribution of a species of molecules originated from a sample by at least an ionization process can be deduced from the ion which is originated from a sample by at least an ionization process by looking for the molecular formula of the ion after the charge of the ion has been reduced to zero and changing the molecular formula accordingly to the ionization process as described below.

In the species of molecules all molecules have the same composition of atoms according to the molecular formula. But each atom of the molecule can occur as different isotopes. So, the basic element of the organic chemistry, the carbon atom occurs in two stable isotopes, the $^{12}C$ isotope with a natural probability of occurrence of 98.9% and the $^{13}C$ isotope (having one more neutron in its atomic nucleus) with a natural probability of occurrence of 1.1%. Due to these probabilities of occurrence of the isotope particularly complex molecules of higher mass consisting of a higher number of atoms have a lot of isotopes. These isotopes have different masses resulting in a mass distribution of the isotopes, named in the content of this patent application isotope distribution (short term: ID) of the species of molecules. Each species of molecules therefore can have different masses but for a better understanding and identification of a species of molecules to each molecule is assigned a monoisotopic mass. This is the mass of a molecule when each atom of the molecule exists as the isotope with the lowest mass. For example, a methane molecule has the molecular formula $CH_4$ and hydrogen has the isotopes $^1H$ having on a proton in his nucleus and $^2H$ (deuterium) having an additional neutron in his nucleus. So, the isotope of the lowest mass of carbon is $^{12}C$ and the isotope of the lowest mass of hydrogen is $^{1}H$. Accordingly the monoisotopic mass of methane is 16 u. But there is a small probability of other methane isotopes having the masses 17 u, 18 u, 19 u, 20 u and 21 u. All these other isotopes belong to the isotope distribution of methane and can be visible in the mass spectrum of a mass spectrometer.

In the first step of the inventive method a mass spectrum of the sample has to be measured by a mass spectrometer. In general, every kind of mass spectrometer can be used known to a person skilled in the art to measure a mass spectrum of a sample. In particular, it is preferred to use a mass spectrometer of high resolution like a mass spectrometer having an ORBITRAP mass analyzer, a FT-mass spectrometer, an ICR mass spectrometer or an MR-TOF mass spectrometer. Other mass spectrometers for which the inventive method can be applied are particularly TOF mass spectrometer and mass spectrometer with a HR quadrupole mass analyzer. But the inventive method has also the advantage that it is able to identify the monoisotopic mass of species of molecules if the mass spectrum is measured with a mass spectrometer having a low resolution so that for example the neighboring peaks of isotopes having a mass difference of 1 u cannot be distinguished.

On the one hand molecules, already present in the sample are set free and are only charged by the ionization process e.g. by the reception and/or emission of electrons, protons ($H^+$) and charged particles. The method of the invention is able to assign to these species of molecules contained in the sample its monoisotopic mass due to their ions which are detected in the mass spectrum of the mass spectrometer.

On the other hand, the ionization process can change the molecules contained in the sample by fragmentation to smaller charged particles or addition of atoms or molecules to the molecules contained in the sample resulting in larger molecules which are charged due to the process. Also by an ionization process the matrix of a sample can be split into molecules which are charged or clusters of molecules can be build. So, all these ions are originated from the sample by a described ionization process. So, for these ions the accordingly species of the molecules originated from the sample can be investigated by the inventive method and the method may be able to identify their monoisotopic mass.

In a next possible step of the inventive method at least a mass range of the measured mass spectrum is divided in fractions. This step can be for example executed by a processor being a part of the mass spectrometer which may have additional other functions like to control the mass spectrometer. It is the object of the partition of the mass range that each fraction can be assigned to one processor of several processors provided by a multiprocessor having several central processor units (CPU) which then can in a single thread deduce in the assigned fraction of the mass range isotope distributions of ions of species of molecules having a specific charge z. Typically a multiprocessor has 2 or 4 CPU's to deduce in fractions assigned to the specific CPU isotope distributions of ions of species of molecules having a specific charge z. But still more CPU's e.g. 6, 8 or 12 can be used for the deduction of the isotope distributions. If more CPU's are used accordingly for more fractions the isotope distributions of ions of species of molecules having a specific charge z can be deduced in parallel.

After the measurement of a mass spectrum of a sample by the mass spectrometer it has to be defined which ranges of m/z values detected by the measurement shall be used to identify the monoisotopic masses of species of molecules contained in a sample and/or originated from the sample by at least the ionization process during their ionization in the mass spectrometer. The used ranges of detected m/z values can be defined by the user. He can define the ranges before the measurement of the mass spectrum is started or after is mass spectrum is shown on a graphical output system like a display. The ranges can be defined based on the intention of investigation of the sample and/or based on the resulting mass spectrum. So, if in a range of m/z values no peaks are observed, this range of the m/z values can be suspended from further evaluation and do not belong to the range of M/Z values divided in fractions.

The used ranges of detected m/z values can be defined also by a controller who is controlling the method of identification. For example, if in a measured mass spectrum in a range of m/z values no peaks or no peaks having an intensity higher than a threshold value are observed, this range of the m/z values can be suspended from further evaluation by the controller restricting the ranges of m/z values used to identify the monoisotopic masses.

In one embodiment of the inventive method the whole range of m/z values detected by the mass spectrometer and therefore shown in the measured mass spectrum is divided in fractions used to deduce isotope distributions.

This is shown in FIG. 1 showing a mass spectrum measured by a mass spectrometer. The mass spectrometer was detecting ions having a m/z value (ratio of ion mass m and ion charge z) between a minimum value $m/z_{min}$ and a maximum value $m/z_{max}$. This whole range of m/z values between a minimum value $m/z_{min}$ and a maximum value $m/z_{max}$ can then be divided in fractions which are then assigned to discrete processors (CPU) to deduce isotope distributions of ions of species of molecules contained in the sample and/or originated from the sample by at least an ionization process having a specific charge z.

In another embodiment of the inventive method not the whole range of m/z values detected by the mass spectrometer and therefore shown in the measured mass spectrum is divided in fractions used to deduce isotope distributions. In this embodiment, only one or more specific ranges of the m/z value of the mass spectrum detected by the mass spectrometer are divided in fractions used to deduce isotope distributions.

This is also shown in FIG. 1 showing a mass spectrum measured by a mass spectrometer. The mass spectrometer was detecting ions having a m/z value (ratio of ion mass m and ion charge z) between a minimum value $m/z_{min}$ and a maximum value $m/z_{max}$. But it is also possible that not the whole range of m/z values between a minimum value $m/z_{min}$ and a maximum value $m/z_{max}$ is divided in fractions which are then assigned to discrete processors (CPU) to deduce isotope distributions of ions of species of molecules contained in the sample and or originated from the sample by at least an ionization process having a specific charge z. It is also possible that specific ranges of measured m/z values are divided in fractions which are then assigned to discrete processors (CPU) to deduce isotope distributions. In FIG. 1 it is shown the range A and the range B of the m/z values. In one embodiment, only the range A of measured m/z values is divided in fractions which are then assigned to discrete processors (CPU) to deduce isotope distributions. In another embodiment, only the range B of measured m/z values is divided in fractions which are then assigned to discrete processors (CPU) to deduce isotope distributions. In a further embodiment both ranges, the range A of measured m/z values and the range B of measured m/z values are divided in fractions which are then assigned to discrete processors (CPU) to deduce isotope distributions. According to FIG. 1 in this embodiment only those ranges, the ranges A and B, are divided in fractions and used for the deduction of isotope distributions, which in which peaks have been measured of a relative abundance of more than 5%.

At the beginning the at least one range of measured m/z values is divided in a fraction of a specific window width $\Delta m/z_{start}$. Typically, the window width $\Delta m/z_{start}$ is slightly larger than 1 Th (Thompson; 1 Th=1 u/e; u: atomic mass unit; e: elementary charge; 1 u=$1.660539*10^{-27}$ Kg; 1 e=$1.602176*10^{-19}$ C). In preferred embodiments, the window width $\Delta m/z_{start}$ is between 1.000 Th and 1.100 Th, in a more preferred embodiment, the window width $\Delta m/z_{start}$ is between 1.005 Th and 1.050 Th, and in a particularly preferred embodiment, the window width $\Delta m/z_{start}$ is between 1.010 Th and 1.020 Th. The window width $\Delta m/z_{start}$ is chosen in the range of 1 Th, because at the lowest charge state of an ion the charge is z=1 and therefore the smallest distance between the m/z values of neighboring isotopes is 1 Th. This takes securely into account some technical tolerances the window width $\Delta m/z_{start}$ has to be chosen slightly larger than 1 Th. The technical tolerances are originated e.g. by deviation due to chemical elements, peak widths, the centroidisation of m/z peaks.

All of these fractions with the starting window width $\Delta m/z_{start}$ are investigated if they have a significant peak. Only fractions with such a peak are assigned to a processor which will then deduce an isotope distribution from the measured mass spectrum in the range of the fraction of the at least one range of measured m/z values. Mostly the investigation if a fraction with the starting window width $\Delta m/z_{start}$ has a significant peak is started at one boundary of the at least one range of measured m/z values which shall be divided, the highest m/z value or the lowest m/z value. A fraction has a significant peak if the peak of the highest intensity of the fraction has a signal to noise ratio S/N which is higher than a threshold value T.

After a fraction with the starting window width $\Delta m/z_{start}$ has been investigated if it has a significant peak, the neighboring fraction with the starting window width $\Delta m/z_{start}$ not investigated before will be investigated if it has a significant peak. Neighboring fractions are concatenated to build a fraction of the larger window width $\Delta m/z$ if both fractions comprise isotopes of the same isotope distribution of ions of a species of molecules of a specific charge or isotopes of contiguous isotope distributions or overlapping isotope distributions. Therefore, two neighboring fractions are not concatenated if one of them has no significant peak.

If the investigation if a fraction with the starting window width $\Delta m/z_{start}$ has a significant peak is started at one boundary of the at least one range of measured m/z values which shall be divided the investigation ends with that neighboring fraction not investigated before which comprises the second boundary of the at least one range of measured m/z values which shall be divided. If only one range of measured m/z values shall be divided into fractions, then the whole investigation of the fractions is finished. If not only one range of measured m/z values shall be divided into fractions, then the next range of measured m/z values which shall be divided which has not already divided in fractions is divided into fractions in the same way or with different parameters. The dividing into fractions is finished after all ranges of measured m/z ranges which have been defined to be divided have been divided in fractions.

The concatenation of fractions of the starting window width $\Delta m/z_{start}$ may be limited to specific number of such fractions. Due to this too long operation time of a single processor to deduce isotope distributions in an assigned concatenated fraction can be avoided which would increase the whole time to execute the inventive method. In a preferred embodiment of the inventive method not more than 20 fractions of the starting window width $\Delta m/z_{start}$ should be concatenated, in a more preferred embodiment of the inventive method not more than 12 fractions of the starting window width $\Delta m/z_{start}$ and in a particular preferred embodiment of the inventive method not more than 8 fractions of the starting window width $\Delta m/z_{start}$.

In an embodiment of the inventive method the threshold value T defining if a fraction has a significant peak is for all investigated fractions the same. Usually threshold values T in the range of 2.0 to 5.0 are used, preferably in the range of 2.5 to 4.0 and particularly preferably in the range of 2.8 to 3.5.

In another embodiment, the threshold value T is dynamically adjusted. In one preferred embodiment, it is changed depending on the peak density of the fractions. Then the threshold value T is increased if fractions have a high number of significant peaks N to limit the number of peaks N from which isotope distributions are deduced by the processors. Therefore, number of peaks N having a signal to noise ratio S/N which is higher than a threshold value T is limited in each fraction. Such a fraction can be concatenated of fractions having the starting window width $\Delta m/z_{start}$. The number of significant peaks N in a fraction is limited by a limit $N_{max}$. This can be set by the user, the controller or the producer of the controller by hardware or software. Typically, $N_{max}$ is in the range of 100 to 500, preferably in the range of 180 to 400 and particularly preferably in the range of 230 to 300. At the beginning, there is set an initial threshold value $T_i$. Usually the initial threshold value $T_i$ is set in the range of 2.0 to 5.0, preferably in the range of 2.5 to 4.0 and particularly preferably in the range of 2.8 to 3.5. If the number of significant peaks N having a signal to noise ratio S/N which is higher than a threshold value T is higher than the limit $N_{max}$ in a fraction, the threshold T is increased by a factor and then the fraction is investigated again regarding the number of significant peaks N having a signal to noise ratio S/N which is higher than a threshold value T. In increase of the threshold is repeated up to the number of peaks having a signal to noise ratio S/N which is higher than a threshold value T is below the limit $N_{max}$. Typically, the threshold T is increased with the factor between 1.10 and 2.50. Preferably the threshold T is increased with the factor between 1.25 and 1.80. Particular preferably the threshold T is increased with the factor between 1.35 and 1.6. The increase of the threshold T is limited by a maximum value $T_{max}$ of the threshold. By this limit it shall be avoided that significant peaks of the sample will be ignored. The maximum value of the threshold $T_{max}$ can be set by the user, the controller or the producer of the controller by hardware or software. Typically, the maximum value of the threshold $T_{max}$ is set between 6 and 40. Preferably the maximum value of the threshold $T_{max}$ is set between 10 and 30. Particular preferably the maximum value of the threshold $T_{max}$ is set between 12 and 20.

If for a number of fractions, which may be fractions with the starting window width $\Delta m/z_{start}$ or fraction of the larger window width $\Delta m/z$ concatenated from fractions with the starting window width $\Delta m/z_{start}$, are investigated one after the other, the threshold T has not been increased for these fractions and the threshold of the fractions is higher than the initial threshold $T_i$ then the threshold T of the following neighboring fractions will be decreased, preferably successively, down to the initial threshold $T_i$. This decrease of the threshold T with may be done by subtracting a specific value or by reducing the threshold T by a factor. Typically, the specific value subtracted is between 0.10 and 0.70, preferably between 0.15 and 0.40 and particularly preferably between 0.20 and 0.30. The factor reducing the threshold T is typically between 0.85 and 0.99, preferably between 0.92 and 0.97 and particularly preferably between 0.95 and 0.96. It is also possible to use both methods to decrease the threshold T at the same time and to use the higher or lower decreased value of the threshold T following neighboring fraction. A decrease of the threshold below the initial threshold $T_i$ should not be done. If this would happen the following neighboring fractions should be investigated using the initial threshold $T_i$.

If a fraction with the starting window width $\Delta m/z_{start}$ has been investigated with a threshold value T which is higher than the initial threshold $T_i$ and this fraction has no significant peak, in one embodiment of the inventive method then the investigation is executed again with the initial threshold $T_i$. If then a significant peak has been observed for the fraction, this fraction is marked to be a fraction with a low signal to noise ratio S/N.

In further possible step of the inventive method at least some of the fractions of the at least one range of measured m/z values are assigned to a processor. The processor is one processor of several processors provided by a multiprocessor having several central processor units (CPU). The processor can in a single thread deduce in the assigned fraction of the mass range isotope distributions of ions of species of molecules having a specific charge z. Typically a multiprocessor has 2 or 4 CPU's to deduce in fractions assigned to the specific CPU isotope distributions of ions of species of molecules having a specific charge z. But still more CPU's e.g. 6, 8 or 12 can be used for the deduction of the isotope distributions. If more CPU's are used accordingly for more fractions the isotope distributions of ions of species of molecules having a specific charge z can be deduced in parallel. The processors of the multiprocessor can be physically located at one place. Then the multiprocessor can be part of the mass spectrometer. The multiprocessor can be also used for other functions of the mass spectrometer like controlling functions of the mass spectrometer known to a person skilled of the art. The multiprocessor physically located at one place can be separated from the mass spectrometer and for example just receiving files of the measured mass spectrum for the mass spectrometer. Also, the various multiprocessors can be located at different places and may be communicating with the mass spectrometer for example with a control unit of the mass spectrometer.

This step of assigning at least some of the fractions of the at least one range of measured m/z values to a processor can be for example executed by a processor being a part of the mass spectrometer which may have additional other functions like to control the mass spectrometer.

In a preferred embodiment of the inventive method only fractions having a significant peak are assigned to a processor. These fractions can have on the one hand the starting window width $\Delta m/z_{start}$. On the other hand, these fractions can have a larger window width $\Delta m/z$ because they are built from concatenated neighboring fractions.

In another preferred embodiment of the inventive method only fractions having a significant peak and fractions marked to be a fraction with a low signal to noise ratio S/N are assigned to a processor.

In a preferred embodiment of the invention to each processor $P_i$ of the multiprocessor used to deduce isotope distributions of ions of species of molecules having a specific charge z from the measured mass spectrum in assigned fractions of the at least one range of measured m/z values the assignment is assigned a peak counter $C_i$ and list in which information regarding the assigned fraction is stored. With the peak counter $C_i$ the number of significant peaks N of each fraction assigned to the processor $P_i$ is counted by the addition of the number of significant peaks N of all assigned fractions. The number of significant peaks N is investigated for each fraction when dividing the at least one range of measured m/z values in fractions to assess if the number of significant peaks N exceed the limited number of significant peaks $N_{max}$.

The fractions having a significant peak or the fractions having a significant peak and fractions marked to be a fraction with a low signal to noise ratio S/N are assigned one after the other to the processors $P_i$. The next fraction to be assigned to a processor is always assigned to that processor whose up to that moment assigned fractions have the lowest number of significant peaks in total. That means that the next fraction to be assigned to a processor is always assigned to that processor $P_i$ whose peak counter $C_i$ is the lowest. The number of the significant peaks of that assigned fraction is added to the peak counter $C_i$. So, always to that processor to which the lowest number of significant peaks is assigned the next fraction having significant peaks is assigned. With this assignment, it is ensured that the number of significant peaks in the assigned fractions is even distributed across the processors. This ensures that the deducing of isotope distributions from the fractions assigned to the processors takes for every processor nearly the same time. With this assignment, a fast deducing of isotope distributions by the several provided processors is achieved.

The steps of dividing at least one range of measured m/z values of the mass spectrum of the sample into fractions and assigning at least some of the fractions of the at least one range of measured m/z values to one processor of several provided processors can be done successive or parallel. If the steps are executed in parallel, then each fraction defined in the step of dividing at least one range of measured m/z values of the mass spectrum of the sample into fractions is immediately after its definition assigned to the processor who will deduce the isotope distributions for this fraction.

In a next step of the inventive method an isotope distribution of ions of a species of molecules having a specific charge z is deduced from the measured mass spectrum in at least one of the fractions of the at least one range of m/z values. The deduced isotope distribution of ions having a specific charge z is deduced for ions of a species of molecules contained in the sample or for ions originated from the sample by at least an ionization process. Preferably for several ions of a species of molecules contained in the sample or/and originated from the sample by at least an ionization process an isotope distribution of the ions having a specific charge z can be deduced.

In one embodiment of the inventive method in each of the fractions of at least one range of measured m/z values at least one isotope distribution of ions of one species of molecules having a specific charge z is detected.

It is possible that not for all specifies of molecules for which an isotope distribution of their ions having a specific charge z is deduced the monoisotopic mass will be deduced by the inventive method.

In the following is described how in one fraction of the at least one range of measured m/z values which is assigned to one processor isotope distributions of ions of a species of molecules having a specific charge z are deduced from the measured mass spectrum according to a preferred embodiment of the inventive method. Preferably only peaks are used which have been identified as significant peaks before as described above.

At first the peak of highest intensity in investigated fraction of measured m/z values is defined. Then the maximum charge state $z_{max}$ which can be assigned to this peak of highest intensity has to be defined. Therefore, the closest peaks adjacent to the peak of highest intensity have to be identified. They should have an intensity which is not below a relative intensity value compared to the peak of highest intensity (typical 2% to 6% of the intensity of the peak of highest intensity, preferably 3% to 5% and particularly preferably 4%). Also, preferably the distance of these peaks should not be larger than the starting window width $\Delta m/z_{start}$. From the distance d between the peak of highest intensity and the closest peak adjacent to the peak of highest intensity a possible maximum charge state $z_{max}$ can be assumed taking into account the mean isotope mass difference distance $\Delta m_{ave}$ according to a average distribution (described e.g. by Senko et al. J. J. Am. Mass Spectrom. 1995, 6, 229-233 and Valkenborg et al. J. Am. Mass Spectrom. 2008, 19, 703-712)

$$z_{max} = \frac{\Delta m_{ave}}{d}$$

Typically values for the mean isotope mass difference distance $\Delta m_{ave}$ are in the range of 1.0020 u to 1.0030 and preferably between 1.0023 and 1.0025 u. Particular preferably the value 1.00235 is used as the mean isotope mass difference distance $\Delta m_{ave}$.

Preferably the so evaluated maximum charge state $z_{max}$ can be further increased by a factor larger than 1. Due to this it shall be secured that at least one higher charge state is investigated. Typically, the factor with which the evaluated maximum charge state is multiplied is in the range of 1.10 and 1.30, preferably in the range of 1.125 and 1.20. Preferably the so achieved is round up to the next natural number, i.e. positive integer.

Preferably the maximum charge state $z_{max}$ can be limited to maximum value $z_{limit}$. This can depend on the type of the sample which is investigated by the inventive method. So, if intact proteins are investigated the maximum charge state $z_{max}$ is preferably limited to values between 50 and 60 and if peptides are investigated the maximum charge state $z_{max}$ is preferably limited to values below 20. A reasonable choice of the limit $z_{limit}$ of the maximum charge state $z_{max}$ avoids the investigation of unrealistic charge states and reduces therefore the time to deduce the isotope distributions. In general, the maximum value $z_{limit}$ limiting the maximum charge state $z_{max}$ of an investigated charge state is typically between 10 and 100, preferably between 30 and 80 and particularly preferably between 40 and 70. The limit $z_{limit}$ of the maximum charge state $z_{max}$ can be set by the user, the controller or the producer of the controller by hardware or software. Preferably the limit $z_{limit}$ of the maximum charge state $z_{max}$, if set by the controller or the producer of the controller by hardware or software is set according to an information of the user, which kind of sample shall be investigated.

After the value of the maximum charge state $z_{max}$ has been defined for the investigated peak of highest intensity P1 in the investigated fraction of measured m/z values for each charge state z between the charge 1 and the maximum charge state $z_{max}$ a score value, the charge score $cs_{P1}(z)$ is evaluated from mass spectrum in the investigated fraction of measured m/z values. The charge score $cs_{PX}(z)$ of a measured peak PX (X=1, . . . , N) in general reflects to probability that the measured peak PX belongs to an isotope distribution with the charge z.

In a preferred embodiment of the inventive method the charge score $cs_{PX}(z)$ of a measured peak PX assumed as the peak of an isotope distribution of the highest intensity is determined in the following mode:

Based on an average model at first it is defined how much peaks $N_{left\_PX}(z)$ of an isotope distribution can be expected for the peak PX having smaller m/z values and how much peaks $N_{right\_PX}(z)$ of an isotope distribution can be expected for the peak PX having higher m/z values. Preferably only those peaks of the isotope distribution are taken into account which have an intensity, which is not smaller than a percentage of the intensity of the highest peak PX of the investigated isotope distribution, the cut-off intensity. Typically, this cut-off intensity is in the range of 0.5 to 6% of the intensity of the highest peak PX, preferably in the range of 0.8 to 4% of the intensity of the highest peak PX. Particular the cut-off intensity is 1% of the intensity of the highest peak PX.

For example, the number of peaks $N_{left\_PX}(z)$ having a smaller m/z value and the number of peaks $N_{right\_PX}(z)$ having a larger m/z value can be calculated by the formulas:

$$V_{left\_PX}(z) = A * \sqrt{\frac{m}{z}(PX) * z} - B$$

$$V_{right\_PX}(z) = C * \sqrt{\frac{m}{z}(PX) * z} + D$$

The value m/z(PX) is the m/z value of the measured peak PX. The constants A, B, C and D are given by the used averaging model. Typical values are: $0.075<A<0.080$, $2.35<B<2.40$, $0.075<C<0.080$, $0.80<D<0.85$.

Hereby is $N_{left\_PX}(z)$ is first positive integer smaller than the value $V_{left\_PX}(z)$ or otherwise 0 and $N_{right\_PX}(z)$ is the integer most closely to the value $V_{right\_PX}(z)$.

Then for all peaks of the isotope distribution assigned to the peak PX and the charge z the according theoretical m/z values are defined.

If a mean isotope mass difference Δm is assumed for the isotope distribution, the peaks of the isotope distribution have the theoretical m/z values:

$$m/z(z)_k = m/z(PX) + k*\Delta m/z$$

with $k=(-N_{left\_PX}(z), \ldots, N_{right\_PX}(z)-2, N_{right\_PX}(z)-1, N_{right\_PX}(z))$ So, for example if $N_{left\_PX}(z)=1$, that means there is one peak in the isotope distribution of the charge z on the left side of the peak PX and $N_{right\_PX}(z)=6$, that means there are six peak in the isotope distribution of the charge z on the left side of the peak PX then the peaks of the isotope distribution have the theoretical m/z values:

$$m/z(z)_k = m/z(PX) + k*\Delta m/z$$

with k=(−1, 0, 1 . . . , 4, 5, 6)

In detail:

$$m/z(z)_{-1} = m/z(PX) - \Delta m/z$$

$$m/z(z)_0 = m/z(PX)$$

$$m/z(z)_1 = m/z(PX) + \Delta m/z$$

$$m/z(z)_2=m/z(PX)+2*\Delta m/z$$

$$m/z(z)_3=m/z(PX)+3*\Delta m/z$$

$$m/z(z)_4=m/z(PX)+4*\Delta m/z$$

$$m/z(z)_5=m/z(PX)+5*\Delta m/z$$

$$m/z(z)_6=m/z(PX)+6*\Delta m/z$$

Then all peaks of the isotope distribution assigned to the peak PX and the charge z are identified in the measured mass spectrum assigned to the investigated fraction of the measured m/z values.

For each peak therefore a search window is defined around their theoretical m/z values defined before.

In a preferred embodiment of the inventive method the search window for a peak of the isotope distribution having the theoretical m/z value $m/z(z)_k$ is defined for a positive k value by:

$$m/z(z)_k-k*\delta\Delta m_{low}/z\leq m/z\leq m/z(z)_k+k*\delta\Delta m_{high}/Z$$

The values $\delta\Delta m_{low}$ and $\delta\Delta m_{high}$ are correlated to the possible deviation of the of mean isotope mass difference Δm of the peaks an isotope distribution to lower masses and higher masses.

Typical values of $\delta\Delta m_{low}$ are between 0.004 and 0.007, preferably between 0.005 and 0.006. Typical values of $\delta\Delta m_{high}$ are between 0.003 and 0.006, preferably between 0.0035 and 0.0045.

For each defined peak of an isotope distribution in the search window of m/z values around the theoretical m/z values $m/z_k$ the peak of highest intensity is identified and assigned to this peak. For this peaks the intensity $I_k(z)$ and the real observed m/z values $m/z(z)_{k\_obs}$ are determined.

Only peaks having an intensity, which is not smaller than a percentage of the intensity of the highest peak PX of the investigated isotope distribution, are taken into account for further evaluation of the charge score $cs_{PX}(z)$. Typically, the percentage of the intensity of the highest peak PX, which peaks taken into account should have is between 2% and 10%, particularly between 3% and 6%.

In one embodiment of the invention also peaks are taken into account which are located at the border of the search window of m/z values and cannot be identified as a real peak having a maximum compared to its surrounding. In this case, not the peak at the border is assigned to the searched peak of the isotope distribution. Then next peak outside the border of the search window of m/z values is identified to the searched peak of the isotope distribution, because this case a flank of this peak is located at the border of the search window of m/z values. Also for this peaks the intensity $I_k(z)$ and the real observed m/z values $m/z(z)_{k\_obs}$ are determined.

In a preferred embodiment of the inventive method the charge score $cs_{PX}(z)$ of a measured peak PX can be deduced from at least three sub charge scores $cs_{i\_PX}(z)$.

In one embodiment charge score $cs_{PX}(z)$ of a measured peak PX can be deduced by multiplication of the at least three sub charge scores $cs_{i\_PX}(z)$.

In a preferred embodiment charge score $cs_{PX}(z)$ of a measured peak PX can be deduced by multiplication of four sub charge scores $cs_{i\_PX}(z)$ with i=1, 2, 3, 4.

$$cs_{PX}(z)=cs_{1\_PX}(z)*cs_{2\_PX}(z)*cs_{3\_PX}(z)*cs_{4\_PX}(z)$$

One possibility to evaluate a sub charge score $cs_{P\_PX}(z)$ which can be used in the inventive method is the use of the Patterson function. This method is described in M. W. Senko et al., J. Am. Soc. Mass Spectrom. 1995, 6, 52-56.

In general, this sub charge score is calculated by:

$$cs_{P\_PX}(z)=\sum_{j=-N_{left_{PX}}(z)+1}^{N_{right\_PX}(z)} I_{j-1}(z)*I_j(z)$$

In a preferred embodiment in the calculation of the sub charge score $cs_{P\_PX}(z)$ the deviation of the observed m/z values $m/z(z)_{k\text{-}obs}$ from the theoretical m/z values $m/z(z)_k$ for each peak of an isotope distribution is taken into account by defining corrected intensities $I_{corr\_k}(z)$ for each peak of a isotope distribution:

$$I_{corr\_k}(z)=I_k(z)*(1-2*((m/z(z)_{k\text{-}obs}-m/z(z)_k)/W_k)^2)$$

$W_k$ is the full-width at half maximum (FWHM) of the peak of the isotope distribution having the theoretical m/z value $m/z(z)_k$.

Only those corrected intensities $I_{corr\_k}(z)$ are used which are above the noise level in the m/z range of the observed m/z value $m/z(z)_{k\text{-}obs}$. Otherwise the corrected intensities $I_{corr\_k}(z)$ is set to the noise level in the m/z range of the observed m/z value $m/z(z)_{k\text{-}obs}$.

Then the sub charge score is calculated by:

$$cs_{P\_PX}(z)=\sum_{j=-N_{left_{PX}}(z)+1}^{N_{rightPX}(z)} I_{corr\_j-1}(z)*I_{corr\_j}(z)$$

One second possibility to evaluate a sub charge score $cs_{AS\_PX}(z)$ which can be used in the inventive method is the use of an accuracy score. This method is described in Z. Zhang and A. G. Marshall, J. Am. Soc. Mass Spectrom. 1998, 9, 225-233.

At first for each peak of the isotope distribution an Z score is defined. This value is describing the ratio between the maximum deviation possible for a peak of the isotope distribution and the real deviation of the real observed m/z values $m/z(z)_{k\_obs}$ from the theoretical value $m/z(z)_k$. The Z score $Z_k(z)$ is given by:

$$Z_k(z)=\delta m/z_{max}*m/z_{PX}/|m/z(z)_{k\_obs}-m/z(z)_k|$$

$\delta m/z_{max}$ is the maximum relative deviation of the m/z of the mass spectrometer used to measure the mass spectrum of the sample.

Preferably $_{the}$ Z Zscore $Z_k(z)$ is limited to a specific range of values. This may be e.g. a range of the value between 1 and 5.

Then the sub charge score $cs_{AS\_PX}(z)$ is evaluated by summing up the Zscore values of all peaks of the investigated isotope distribution $$cs_{AS\_PX}(z)=\sum_{j=-N_{left_{PX}}(z)}^{N_{right\_PX}(z)} Z_k(z).$$

One third possibility to evaluate a sub charge score $cs_{AC\_PX}(z)$ which can be used in the inventive method is the use of an autocorrelation function, which rates the fluctuations in the peaks of the isotope distribution.

For the calculation of this sub charge score again the above described corrected intensities $I_{corr\_k}(z)$ for each peak of a isotope distribution is used.

The sub charge score $cs_{AC\_PX}(z)$ is calculated by:

$$cs_{AC\_PX}(z) = \sum_{j=-N_{left_{PX}}(z)+1}^{N_{right\_PX}(z)} I_{corr\_j-1}(z) * I_{corr\_j}(z) / \sum_{j=-N_{left_{PX}}(z)}^{N_{right\_PX}(z)} I_{corr_j}(z)^2$$

This charge score is preferably used only for isotope distributions having at least 3 peaks, preferably 4 peaks. Otherwise the charge score is set to the value 1.

One fourth possibility to evaluate a sub charge score $cs_{IS\_PX}(z)$ which can be used in the inventive method is the use of an isotope score. This score puts the number of observed peaks $N_{obs\_PX}(z)$ of an isotope distribution in relation to the number of theoretically expected peaks $N_{theo\_PX}(z)=N_{left\_PX}(z)+N_{left\_PX}(z)+1$.

The sub charge score $cs_{IS\_PX}(z)$ may be calculated by:

$$Cs_{IS\_PX}(z)=(N_{obs\_PX}(z)+0.5)/(N_{theo\_PX}(z)-1).$$

In a preferred embodiment of the inventive method the charge score $cs_{PX}(z)$ of a measured peak PX is deduced by multiplication of at least three of the four sub charge scores $cs_{P\_PX}(z)$, $cs_{AS\_PX}(z)$, $cs_{AC\_PX}(z)$ and $cs_{IS\_PX}(z)$.

In a particular preferred embodiment of the inventive method the charge score $cs_{PX}(z)$ of a measured peak PX is deduced by multiplication of four sub charge scores $cs_{P\_PX}(z)$, $cs_{AS\_PX}(z)$, $cs_{AC\_PX}(z)$ and $cs_{IS\_PX}(z)$.

$$cs_{PX}(z)=cs_{P\_PX}(z)*cs_{AS\_PX}(z)*cs_{AC\_PX}(z)*cs_{IS\_PX}(z)$$

After for each charge state z between the charge 1 and the maximum charge state $z_{max}$ a score value, the charge score $cs_{P1}(z)$ for the peak P1, the peak of the highest intensity, is evaluated from mass spectrum in the investigated fraction of measured m/z values, the charge score $cs_{P1}(z)$ for the peak P1 are ranked. Then the charge score of the highest value $cs_{P1}(z_1)$ of the charge state $z_1$ is compared with the charge score of the second highest value $cs_{P1}(z_2)$ of the charge state $z_2$. If the ratio of these values is above a threshold $T_{cs}$, the charge state $z_1$ is accepted as the correct charge state of the peak P1 and his related isotope distribution.

$$cs_{P1}(z_1)/cs_{P1}(z_2)>T_{cs}$$

So, if the charge state $z_1$ is accepted it is deduced from the peak P1 of the measured mass spectrum and its surrounding mass spectrum its related isotope distribution having peaks of the intensity $I_k(z_1)$ and the real observed m/z values $m/z(z_1)_{k\_obs}$ $(k=(-N_{left\_PX}(z_1), \ldots, N_{right\_PX}(z_1)))$ and the specific charge $z_1$. This isotope distribution is the isotope distribution of ions of a species of molecules. The species of molecules is either contained in the investigated sample which have been charged by an ionization process without changing its mass or the ions of a species of molecules are originated from a sample by at least an ionization process.

By the value of the threshold $T_{cs}$ it can be defined how clearly the best two evaluated charge scores $cs_{P1}(z_1)$ and $cs_{P1}(z_2)$ having the highest values have to differ that the isotope distribution related to the charge state $z_1$ can unambiguously deduced as the isotope distribution comprising the peak P1. Typically, the value of the threshold $T_{cs}$ is in the range of 1.10 and 3, preferably in the range of 1.15 and 2 and preferably in the range of 1.20 and 1.50. The value of the threshold $T_{cs}$ can be set by the user, the controller or the producer of the controller by hardware or software.

From the deduced isotope distribution ions of a species of molecules of the specific charge $z_1$ the monoisotopic mass of the species of molecules and/or the monoisotopic peak of the species of molecules can be deduced by methods known by a person skilled in the art e.g. by an averaging fit to the pattern of the peaks of the isotope distribution or looking directly for the monoisotopic peak in the isotope pattern of the isotope distribution.

After isotope distribution comprising the peak P1 could be deduced the peaks of this isotope distribution are removed from the significant peaks in the fraction. Then the peak of highest intensity of the remaining significant peaks of the fraction is defined. For this peak P2 then in the same way as for peak 1 the maximum charge state $z_{max}$ has to be defined, for each charge state z between the charge 1 and the maximum charge state $z_{max}$ the charge scores $cs_{P2}(z)$ have to be evaluated from mass spectrum in the investigated fraction of measured m/z values and it has to be checked if the charge score of the highest value $cs_{P2}(z_1)$ accepted as the correct charge state of the peak P2. By repeating this procedure as much as possible as much as possible isotope distribution of ions of species of molecules having a specific charge Z and also monoisotopic masses of the species of molecules can be deduced from a fraction of the at least one range of measured m/z values of the mass spectrum by one single processor.

Preferably this is done for all fractions of the at least one range of measured m/z values of the mass spectrum having a significant peak by their assigned processors.

So, from the whole m/z range of the at least one range of measured m/z values isotope distributions of ions of species of molecules having a specific charge can be deduced fraction by fraction by parallel deducing with several processors of a multiprocessor. By dividing the at least one range of measured m/z values which shall be investigated in fractions and assigning these fractions to the several processors the deducing isotope distributions the whole m/z range of the at least one range of measured m/z values can be done much faster and also the deducing of monoisotopic masses from the deduced isotope distributions. Particularly the deduced monoisotopic masses can be used to define specific species of molecules which shall be investigated further with a second mass analyzer. Especially for this experiments the inventive method is very helpful because the information of the monoisotopic mass of a specific molecule is now available in a shorter time. Before the specific species of molecules which shall be investigated further with a second mass analyzer is provided to the mass analyzer it may be convert into another molecule by typical processes used in $MS^2$ or $MS^N$ mass spectrometry like fragmentation, dissociation e.g. in a collision cell or reaction cell.

In another possible step of the inventive method from at least one deduced isotope distribution of each of the at least one species of molecules contained in the sample and/or originated from a sample the monoisotopic mass of the species of molecules is deduced. In an embodiment of the inventive method the monoisotopic mass of the species of molecules contained in the sample and/or originated from the investigated sample is deduced from the isotope distribution of the species of molecules immediately after the deducing of the isotope distribution. In this embodiment, it is may be provided that the monoisotopic mass of one species of molecules is deduced before isotope distribution of another species of molecules is deduced. In one embodiment of the inventive method it is provided that the deduction of monoisotopic mass of some species of molecules happens before the deduction of isotope distribution of other species of molecules.

In general, the step (iv) of the inventive method, the deducting of isotope distributions, and step (v), the deducing of monoisotopic masses, may happen in some embodiments of the inventive method in parallel.

In a preferred embodiment of the inventive method for some of the species of molecules contained in the sample and/or originated from a sample by at least an ionization process the monoisotopic mass is deduced from two or more deduced isotope distributions of their ions having a different specific charge z.

In a preferred embodiment of the inventive method at least some of the isotope distributions, preferably a portion of the isotope distributions and particular preferably all isotope distributions deduced in the step (iv) of the inventive method are investigated if one or more of their peaks might belong to an isotope distribution of a higher charge state $z_{hi}$, whose peaks of neighboring isotopes are not separated, referred to as a low resolution charge state $z_{hi}$. In particular, for such low resolution charge state $z_{hi}$ an isotope distribution cannot be deduced in step (iv). Such low resolution charge states $z_{hi}$ are only detectable as a single peaks or peak structures, particularly as a peak with a broader width having a larger FWHM (full width half maximum)-value than theoretically expected for the given resolving power of the instrument. These peaks may have further subpeaks in the peak structure, but do not exhibit a distinct structure of neighboring isotopes. Peaks of low resolution charge states $z_{hi}$ are in particular observed in mass spectra detected by mass analyzers of low resolving power, which may be below 50,000, preferably below 35,000 and particular preferably below 25,000. Peaks of low resolution charge states $z_{hi}$ are in particular observed in mass spectra, if the detected ions are produced by soft ionization techniques producing multiply charged ions, e.g. electrospray ionization (ESI). If in the isotope distributions of charge states z the isotope structure is resolved in an detected mass spectrum, depends also on the charge state z, because the difference of the m/z value of two neighboring isotopes is nearly 1/z (assuming that for one element of the observed molecule different isotopes exist), which is the minimum resolution Δ(m/z) a mass analyzer shall have to detect the peaks of neighboring isotopes as separate peaks in a mass spectrum. So, with an increasing charge z of the charge state it is more and more difficult to resolve two neighboring isotopes. Preferably in this preferred embodiment of the inventive method for the investigation if peaks are low resolution charge states $z_{hi}$, the limit $z_{limit}$ of the maximum charge state $z_{max}$ may be increased. In general, the increased maximum value $z_{limit}$ limiting the maximum charge state $z_{max}$ of an investigated charge state may be between 50 and 150, preferably between 75 and 130 and particularly preferably between 85 and 120.

In particular, the limit $z_{limit}$ of the maximum charge state $z_{max}$ may be increased for some mass analyzers, like Orbitrap® mass analyzers, when they may be operated with a reduced resolution to increase their sensitivity for very high charged ions originating from heavy molecules such as large proteins. During this operation mode, due to this preferred embodiment of the inventive method it is possible to identify more such heavy molecules though they are only detected by the mass analyzer as a low resolution charge state $z_{hi}$.

Additional with this preferred embodiment also other peaks of the mass spectrum may be investigated if they might belong to an isotope distribution of a higher charge state $z_{hi}$, whose peaks of neighboring isotopes are not separated, referred to as a low resolution charge state $z_{hi}$.

When an isotope distribution deduced in step (iv) is investigated, if its peaks in the measured mass spectrum might belong to a low resolution charge state $z_{hi}$, at first for one peak of the isotope distribution a parameter correlated to the peak width is determined. Preferably the parameter is determined for a peak of a high relative intensity compared to the peak of the highest intensity of the isotope distribution. The peak may have a relative intensity more than 40%, preferably more than 60% and particularly more than 75% of the intensity of the peak of the highest intensity of the isotope distribution. Particularly preferably the parameter correlated to the peak width is determined for the peak of the highest intensity of the isotope distribution or the central peak of the isotope distribution. The parameter correlated to the peak width which is the determined for the one peak of the isotope distribution, is preferably correlated to the width of the peak at the half value of its maximum. Particularly preferably the parameter correlated to the peak width which is determined for the one peak of the isotope distribution, is the full width of the peak at its half value of its maximum (FHWM-value).

As already explained above the minimum resolution Δ(m/z) of a mass analyzer when measuring a peak has to be similar or below the expected difference $\Delta_{iso}(z)$ of the m/z value of two neighboring isotopes, if their peaks are separated in the mass spectrum.

$$\Delta\left(\frac{m}{z}\right) \leq \Delta_{iso}(z)$$

The difference $\Delta_{iso}(z)$ of the m/z value of two neighboring isotopes is correlated to the expected charge z of an isotope distribution by $$\Delta_{iso}(z) = \Delta_{iso}(1)/z$$

$\Delta_{iso}(1)$ is the mass difference of the isotopes of the single-charged investigated molecule. This value is to a certain degree correlated to the kind of detected molecule. Typically, the value of $\Delta_{iso}(1)$ is between 1.00 and 1.005, preferably between 1.002 and 1.003 and particularly preferably between 1.0022 and 1.0025.

So, for a peak measured with a resolution Δ(m/z) of the mass analyzer only charge states with a charge z fulfilling the requirement the isotopes of their isotope distribution can be resolved:

$$\Delta\left(\frac{m}{z}\right) \leq \Delta_{iso}(1)/z$$

Therefore, a maximum detectable charge state $z_{md}$ is defined for which is requirement is given and the isotope of their isotope distribution are resolved. For charge states above the maximum detectable charge state $z_{md}$ starting with the charge state $z_{md}+1$ the isotopes cannot be resolved due to the limited resolution Δ(m/z). If now the limit $z_{limit}$ of the maximum charge state $z_{max}$ is higher than the maximum detectable charge state $z_{md}$, for the charge states having a charge between $z_{md}+1$ and $z_{limit}$ it is possible that the one peak of the isotope distribution, for the parameter correlated to the peak width is determined, may be a peak of a low resolution charge state $z_{hi}$, and the peak is showing an accordingly isotope distribution in which the isotopes are not separated and resolved.

The peak width of a peak in a mass spectrum can also serve to determine for which charge states z the isotopes of an isotope distribution are separated and therefore the peak has to be assigned to a resolved isotope. If now the isotopes of an isotope distribution of a charge state z are not separated the whole isotope distribution is shown by the peak, which then has a peak width larger than the expected peak width of a single isotope. Generally, it is assumed by this preferred embodiment of the inventive method, that the neighboring isotope peaks of an isotope distribution have the same peak width due to the same resolution. If assuming that two peaks in a mass spectrum are separated, if they are separated at least at the half value of their maximum, the distance between to isotope peaks has to be the FHWM (full width half maximum) value of the isotopes or higher.

So, a peak measured with a FWHM-value of its peak width can be only assigned to resolved isotope of a charge state with a charge z when its FWHM-value is fulfilling this requirement, that the isotopes of the isotope distribution of the charge state with the charge z are resolved:

$$\mathrm{FWHM} \leq \Delta_{iso}(1)/z$$

The FWM-value of the peak is then smaller than the distance of neighboring isotopes of the charge state having the charge z.

Therefore, a maximum charge state $z_{md}$ is determined for which is requirement is fulfilled and the measured peak can be an isotope peak of a resolved isotope distribution. For charge states with a charge above $z_{md}$ the measured peak cannot be a resolved isotope peak due to its limiting FWHM-value. If now the limit $z_{limit}$ of the maximum charge state $z_{max}$ is higher than the maximum detectable charge state $z_{md}$, for the charge states having a charge between $z_{md}+1$ and $z_{limit}$ it is possible that the investigated peak of the isotope distribution of the mass spectrum, for which the parameter correlated to the peak width is determined, may be a peak of a low resolution charge state $z_{hi}$, and the peak is showing an accordingly isotope distribution in which the isotopes are not separated and resolved. The FHWM-value of the investigated peak can be deduced from its determined parameter correlated to the peak width. This is well known to a skilled person and may depend on the expected model of the peak shape of the measured peak. Of course, it is preferable that the determined parameter correlated to the peak width of the investigated peak is the FHWM-value of the investigated peak.

In an further described example of this preferred embodiment of the inventive method the value $\Delta_{iso}(1)=1.00235$ is used and the FHWM-value of the central peak of an investigated isotope distribution is determined.

Then a peak measured with a FWHM-value of its peak width can be only a resolved isotope peak for charge state with a charge z when its FWHM-value is fulfilling the requirement the isotopes of their isotope distribution can be resolved:

$$\mathrm{FWHM} \leq 1.00235/z$$

Therefore, a maximum charge state $z_{md}$ is determined for which this requirement is fulfilled and the measured peak can be an isotope peak of an resolved isotope distribution. For the charge state with charge higher than $z_{md}$ the measured peak cannot be a resolved isotope peak due to its limiting FWHM-value. If now the limit $z_{limit}$ is chosen to be e.g. 100 and this is higher than the maximum detectable charge state $z_{md}$, for the charge states having a charge between $z_{md}+1$ and 100 it is possible that a central peak of an investigated isotope distribution, for which its FHWM-value is determined, may be a peak of a low resolution charge state $z_{hi}$, and the peak is showing an accordingly isotope distribution in which the isotopes are not separated and resolved.

If in this preferred embodiment of the inventive method for the peak of an investigated isotope distribution, for which a parameter correlated to the peak width is determined, has been determined, that the peak may be a peak of a low resolution charge state $z_{hi}$, in a next step of the preferred embodiment of the inventive method at least some, preferably all peaks of the investigated isotope distribution may be further investigated, if they really may be peak of a low resolution charge state $z_{hi}$.

Different criteria may be checked and only if one applied criterion indicates, that the investigated peak of an investigated isotope distribution may be a peak of a low resolution charge state $z_{hi}$, the next steps of preferred embodiment of the inventive method to the investigated peak are executed. In a particular preferred embodiment, the next steps of preferred embodiment of the inventive method to the investigated peak are only executed, if more than one applied criteria indicates that the investigated peak of an investigated isotope distribution may be a peak of a low resolution charge state $z_{hi}$.

The different criteria, which may be checked for the investigated peaks are one or more of the following criteria:

- Check if the investigated peak structure shows a specific feature of an low resolution charge state like
  - a feature of a merged peak like
    - sub peaks in the peak structure
    - broadened peak with an at least nearly doubled peak width
  - a feature of a fragmented peak like
    - broadened peak and close satellite peaks for lower and/or higher m/z-values
- Check, if the peak width, particular the FWHM-value, fits to the expected peak width of an unresolved isotope distribution of an expected charge state of low resolution ($z=z_{md}+1, \ldots, z_{limit}$) (typically a deviation from the expected peak width of 10%, preferably of 3% and particularly of 1% is allowed)
- Check if a neighboring isotope peak of an expected charge state of low resolution ($z=z_{md}+1, \ldots, z_{limit}$) of the investigated peak has a significant intensity (typically between 5% and 500% of the intensity of the investigated peak, preferably between 10% and 300% of the intensity of the investigated peak and particular preferably between 30% and 200% of the intensity of the investigated peak).

One or more of the criteria may be only applied to specific investigated peaks. Whether a criterion is checked may depend on different parameters of the investigated peak, such as its m/z-value, peak intensity, signal/noise ratio, peak width, peak shape and more.

Another check which may be also applied in another step of the preferred embodiment of the inventive method, with which at least some, preferably all peaks of the investigated isotope distribution may be investigated, if they may really be peak of a low resolution charge state $z_{hi}$, is, if the investigated peaks are listed in a database background ions not belonging to the investigated sample (e.g. due to the ionization process of the sample) by comparison of at least the m/z values using e.g. a window of an allowed m/z-value difference. All peaks assigned to the background ions are then no longer investigated in this preferred embodiment of the inventive method whether they are a peak of a low resolution charge state $z_{hi}$.

For the described example of the preferred embodiment of the inventive method all listed criteria are checked for all peaks of the investigated isotope distributions, if the central peak of the investigated isotope distribution, for which its FWHM-value is determined, may be a peak of a low resolution charge state $z_{hi}$. Additionally, it was checked if a peak is listed in a database background ions. Only peaks of the investigated isotope distributions fulfilling at least one criterion and not being in the database of background ions are investigated further if they are a peak of a low resolution charge state $z_{hi}$.

If in this preferred embodiment of the inventive method for the peak of an investigated isotope distribution, for which a parameter correlated to the peak width is determined, has been found, that the peak may be a peak of a low resolution charge state $z_{hi}$, after the execution of one or more of the afore described steps in a next step of the preferred embodiment of the inventive method at least some, preferably all peaks of the investigated isotope distribution may be further investigated by determining a pre-score for each peak. If the check steps mentioned before have been applied to the peaks of the investigated isotope distribution, only peaks are further investigated if the check steps have confirmed that the peak may be a peak of a low resolution charge state $z_{hi}$.

The pre-score for each peak is determined for every charge state having a charge z in the range of 1, 2, 3, . . . $z_{limit}-1$, $z_{limit}$.

The value of $z_{limit}$ may be increased for the investigation of low resolution charge state $z_{hi}$, as described before.

For charge states with a charge z equal or below the maximum detectable charge state $z_{md}$ the pre-score is set to 0, if for the peak no isotope distribution of the charge z has been identified in step (iv) of the inventive method.

If for a charge states with a charge z equal to or below the maximum detectable charge state $z_{md}$ an isotope distribution of the charge z has been identified in step (iv) of the inventive method, the intensity of the highest peak of the neighboring isotope distributions having the charge states z−1 and z+1 is determined. The neighboring charge states of the charge state z are defined by taking into account the way how the different charge states have been generated which is explained in detail below.

If the above mentioned check criteria have been applied to a peak, for which the pre-score shall be calculated, the pre-score is only determined for charge states with a charge z higher the maximum detectable charge state $z_{md}$, if the check criteria have shown, that for the charge z the peak may be a peak of a low resolution charge state $z_{hi}$ (=z).

For charge states z higher the maximum detectable charge state $z_{md}$ the calculation of the pre-sore of a peak for the charge z takes into account the neighbor charge states z−1 and z+1. For the m/z value of the peak the corresponding m/z-values of the charge states z−1 and z+1 are determined and then in a m/z window around these m/z-values the highest peak intensity is determined for these charge states z−1 and z+1. The neighboring charge states of the charge state z are defined by taking into account the way how the different charge states have been generated which is explained in detail below. The m/z window has typically a window size of the $n_i$-fold m/z-distance of neighboring expected isotopes ($n_i$ typically between 4 and 20, preferably between 8 and 16).

The pre-score of a charge state z is then given by the intensity of the highest peak of the charge states z−1 and z+1, if the intensity is below the intensity of the peak, for which the pre-score is determined. If the intensity of the neighboring charge state is equal to or higher than the intensity of the investigated peak, the pre-score of the investigated charge state is limited to the intensity of the investigated peak, for which the pre-score is determined.

For the determination of this pre-scores different processors of a multiprocessor can be used working in parallel deducing in single threads the pre-scores for different charge states and peaks.

In the described example of the preferred embodiment of the inventive method for a peak of an investigated isotope distribution, for which a parameter correlated to the peak width is determined, has been found, that the peak may be a peak of a low resolution charge state $z_{hi}$, after the execution of the afore described steps in a next step all peaks of the investigated isotope distribution are be further investigated by determining a pre-score for each peak. Because the check steps mentioned before have been applied to the peaks of the investigated isotope distribution, only peaks are further investigated for which the check steps have confirmed that the peak may be a peak of a low resolution charge state $z_{hi}$.

When for charge states with a charge z higher the maximum detectable charge state $z_{md}$ for the calculation of the pre-sore of a peak for the charge z is taken into account the neighbor charge states z−1 and z+1, for the m/z values of the peak the corresponding m/z-values of the charge states z−1 and z+1 are determined and then in a m/z window of the 12-fold m/z-distance of neighboring expected isotopes around these m/z-values the highest peak intensity are determined for these charge states z−1 and z+1. If in this preferred embodiment of the inventive method for the peak of an investigated isotope distribution, for which a parameter correlated to the peak width is determined, has been found after the execution of one or more of the afore described steps, that the peak may be a peak of a low resolution charge state $z_{hi}$, in a next step of the preferred embodiment of the inventive method at least some, preferably all peaks of the investigated isotope distribution are further investigated by determining a score $s_{lr\_PL}(z)$ for each peak PL for possible charge states z. If the check steps mentioned before have been applied to the peaks of the investigated isotope distribution, only peaks are further investigated if the check steps have confirmed that the peak may be a peak of a low resolution charge state $z_{hi}$.

If the pre-scores have been determined for the peaks which may be a peak of a low resolution charge state $z_{hi}$, the score is only calculated for that charge states of a peak, which have the highest $N_{pre\text{-}score}$ values of the pre-score. Typically $N_{pre\text{-}score}$ has a value between 3 and 15, preferably a value between 5 and 12 and particularly preferably a value between 7 and 10. So, due to the identification of the most favorable charge states z the number of scores to be determined can be reduced remarkably, which significantly reduces the time to identify the monoisotopic mass or a parameter correlated to the mass of the isotopes of the isotope distribution of molecules, if the identification in this preferred embodiment of the inventive method is also based on low resolution charge states $z_{hi}$.

The determination of a score $s_{lr\_PL}(z)$ of a detected peak PL, which might be a peak of a low resolution charge state $z_{hi}$, for a charge state z is determined by taking into account K neighboring charge states. The neighboring charge states of the charge state z are defined by taking into account the way how the different charge states have been generated which is explained in detail below.

So, for the determination of a score $s_{lr\_PL}(z)$ for the charge state z also the charge states zslr $$z-K/2, z-K/2+1, \ldots z-1, z+1, \ldots z+K/2-1, z+K/2$$

are used. Typically, K has a value between 4 and 16, preferably between 4 and 12, and particularly a value of 8 or 10.

The score $s_{lr\_PL}(z)$ is given by a summation of values $v(S/N_{zslr})$ related to the highest S/N (signal-to-noise)-value of each charge state zslr taken into account.

$$s_{lr_{PL}}(z) = \sum_{zslr=z-\frac{K}{2}}^{z-1} v\left(\frac{S}{N_{zslr}}\right) + \sum_{zslr=z+1}^{z+K/2} v\left(\frac{S}{N_{zslr}}\right)$$

Preferably the value is a function of the logarithm of the S/N-value.

Particular preferably the logarithm of each S/N-value of each charge state zslr is compared with the logarithm of S/N-value of the charge state z and the value v of each charge state zslr is given by the minimum of the logarithm of the S/N-value of the charge state zslr and the logarithm of S/N-value of the charge state z, so that $v(S/N_{zslr})$ is given by:

$$v\left(\frac{S}{N_{zslr}}\right) = \text{argmin}\left(\log\left(\frac{S}{N_{zslr}}\right), \log\left(\frac{S}{N_z}\right)\right)$$

The S/N-value of the charge state z is directly determined from the detected peak PL.

If for a charge states zslr with a charge z equal or below the maximum detectable charge state $z_{md}$ a isotope distribution of the charge zslr has been identified in step (iv) of the inventive method, the S/N-value of the highest peak of the isotope distributions is the highest S/N-value of the charge state zslr. Additional the intensity $I_{zslr}$ of the highest peak of the isotope distributions is determined.

For charge states with a charge zslr higher than the maximum detectable charge state $z_{md}$ the m/z value of the peak corresponding to m/z-values of the charge states zslr is determined and in a m/z window around this m/z-value the highest peak intensity $I_{zslr}$ is determined. The neighboring charge states of the charge state z are defined by taking into account the way how the different charge states have been generated which is explained in detail below. The m/z window has typically a window size of the $n_i$-fold m/z-distance of neighboring expected isotopes ($n_i$ typically between 4 and 20, preferably between 8 and 16). The highest S/N-value of the charge state zslr is then given by the highest peak in the m/z window. A peak is only given, if he is a significant peak having a signal to noise ratio S/N which is higher than a threshold value T as already explained above. If no peak is found, the values $v(S/N_{zslr})$ is set to 0 and also its intensity $I_{zslr}$.

In the described example of the preferred embodiment of the inventive method after the pre-scores have been determined for the peaks which may be a peak of a low resolution charge state $z_{hi}$, the score $s_{lr\_PL}(z)$ is only calculated for that charge states of a peak, which have the highest 8 values of the pre-score.

The determination of a score $s_{lr\_PL}(z)$ of a detected peak PL, which might be a peak of a low resolution charge state $z_{hi}$, for a charge state z is determined taking into account 8 neighboring charge states.

So, for the determination of a score $s_{lr\_PL}(z)$ for the charge state z also the charge states zslr $$z-4, z-3, z-2, z-1, z+1, z+2, z+3, z+4$$

are used.

The score $S_{lr\_PL}(z)$ is given by a summation of values $v(S/N_{zslr})$ related to the highest S/N (signal-to-noise)-value of each charge state zslr taken into account.

$$s_{lr_{PL}}(z) = \sum_{zslr=z-4}^{z-1} v\left(\frac{S}{N_{zslr}}\right) + \sum_{zslr=z+1}^{z+4} v\left(\frac{S}{N_{zslr}}\right)$$

Preferably the value $v(S/N_{zslr})$ of the logarithm of the S/N-value is given by:

$$v\left(\frac{S}{N_{zslr}}\right) = \text{argmin}\left(\log\left(\frac{S}{N_{zslr}}\right), \log\left(\frac{S}{N_z}\right)\right)$$

After the determination of a score $s_{lr\_PL}(z)$ of a detected peak PL the pattern of the used charge states is further investigated, if they have an expected intensity distribution, preferably a Gaussian-shaped intensity distribution. It was found that for this intention a simple method can be used using the highest intensity $I_{zslr}$ determined during the determination of the $S/N_{zslr}$ of each charge state used to calculate the score $s_{lr\_PL}(z)$ of a detected peak PL. From the highest intensity $I_{zslr}$ of each charge state used to calculate the score $s_{lr\_PL}(z)$ of a detected peak PL an autocorrelation value $R_{PL}(z)$ can be determined.

$$R_{PL}(z) = \frac{\sum_{zslr=z-\frac{K}{2}+1}^{z+K/2} I_{zslr-1} * I_{zslr}}{\sum_{zslr=z-\frac{K}{2}}^{z+K/2} t_{zslr}}$$

Here the value $t_{zslr}$ is given by the highest intensities $I_{zslr}$ of each charge state used to calculate the score $s_{lr\_PL}(z)$ in the following manner:

| | |
|---|---|
| zslr = z − K/2 and zslr = z + K/2 | $t_{zslr} = I_{zslr} * I_{zslr}$ |
| zslr > z − K/2 and zslr < z | $t_{zslr} = (\text{argmax}(I_{zslr-1}, I_{zslr}))^2$ |
| zslr = z | $t_{zslr} = (\text{argmax}(I_{z-1}, I_z, I_{z+1}))^2$ |
| zslr > z and zslr < z + K/2 | $t_{zslr} = (\text{argmax}(I_{zslr}, I_{zslr+1}))^2$ |

The function argmax(a,b,c) is defined as the highest value of the values a, b and c.

In the described example of the preferred embodiment of the inventive method from the highest intensity $I_{zslr}$ of each charge state used to calculate the score $s_{lr\_PL}(z)$ of a detected peak PL then the autocorrelation value $R_{PL}(z)$ can be determined by:

$$R_{PL}(z) = \frac{\sum_{zslr=z-3}^{z+4} I_{zslr-1} * I_{zslr}}{\sum_{zslr=z-4}^{z+4} t_{zslr}}$$

Here the value $t_{zslr}$ is given by the highest intensities $I_{zslr}$ of each charge state used to calculate the score $s_{lr\_PL}(z)$ in the following manner:

| | |
|---|---|
| zslr = z − 4 and zslr = z + 4 | $t_{zslr} = I_{zslr} * I_{zslr}$ |
| zslr = z − 3 and zslr = z − 2 and zslr = z − 1 | $t_{zslr} = (\text{argmax}(I_{zslr-1}, I_{zslr}))^2$ |
| zslr = z | $t_{zslr} = (\text{argmax}(I_{z-1}, I_z, I_{z+1}))^2$ |
| zslr = z + 1 and zslr = z + 2 and zslr = z + 3 | $t_{zslr} = (\text{argmax}(I_{zslr}, I_{zslr+1}))^2$ |

Then for each autocorrelation value $R_{PL}(z)$ of a detected peak PL, which might be a peak of a low resolution charge state $z_{hi}$, determined for a charge state z it is determined, if the autocorrelation value $R_{PL}(z)$ is higher than a threshold value $R_{th}$. This threshold value $R_{th}$ is at least 0.2, typically between 0.25 and 0.7, preferably between 0.3 and 0.55 and particular preferably between 0.35 and 0.4. Then for the detected peak PL, which might be a peak of a low resolution charge state $z_{hi}$, the highest scores $s_{lr\_PL}(z)$ of a charge state z are determined, which have a autocorrelation value $R_{PL}(z)$, which is higher than the threshold value. Preferably only such scores $s_{lr\_PL}(z)$ of a charge state z are used to determine the highest scores $s_{lr\_PL}(z)$ of the detected peak PL, which are given by a summation of at least a specific number $N_v$ of values $v(S/N_{zslr})$ of charge states zslr, for which a peak was found in its mass window The specific number $N_v$ is between 3 and 6, preferably 4 or 5. The specific number $N_v$ is the number of identified neighboring charge states zslr of the charge state z of the detected peak PL.

In the described example of the preferred embodiment of the inventive method for each autocorrelation value $R_{PL}(z)$ of a detected peak PL, which might be a peak of a low resolution charge state $z_{hi}$, determined for a charge state z it is determined, if the autocorrelation value $R_{PL}(z)$ is higher than the threshold value $R_{th}$=0.36. Only such scores $s_{lr\_PL}(z)$ of a charge state z are used to determine the highest scores $s_{lr\_PL}(z)$ of the detected peak PL, which are given by a summation of at least a specific number 4 of values $v(S/N_{zslr})$, of charge states zslr, for which a peak was found in its mass window which.

Then for each detected peak PL, which might be a peak of a low resolution charge state $z_{hi}$, the determined highest score $s_{lr\_PL}(z_1)$ of a charge state $z_1$ is compared with the second highest score $s_{lr\_PL}(z_2)$ of a charge state $z_2$. The detected peak PL is only then identified as a low resolution charge state with the charge $z_1$ if one of the two conditions is fulfilled:

$$s_{lr\_PL}(z_1)/s_{lr\_PL}(z_2) > s\text{-ratio} \quad \text{(i)}$$

$$z_1 = 2 * z_2 \quad \text{(ii)}$$

The value s-ratio is a threshold value, defining the relative difference between the highest score $s_{lr\_PL}(z_1)$ and the second highest score $s_{lr\_PL}(z_2)$. The value of s-ratio is typically between 1.1 and 1.5, preferably between 1.2 and 1.3 and particular preferably between 1.22 and 1.27.

In the described example of the preferred embodiment of the inventive method the value of s-ratio is 1.25.

In a particularly preferred embodiment of the inventive method the detected peak PL is only then identified as a low resolution charge state with the charge $z_1$, if the observed charge states of the full charge envelope of all charges 1, 2, . . . , $z_{limit}-1$, $z_{limit}$ assigned to the detected peak PL, if the peak originated by ions of the charge $z_1$, would fulfill one or more of the further conditions, if only charge states zslr are accepted, for which a peak was found in its m/z window:

(i) In the full charge envelope are a specific number $N_{conn}$ of subsequent accepted charge states zslr ($N_{conn}$ is typically between 3 and 10, preferably between 5 and 7, two charge states are subsequent if the charge z+1 of the second subsequent charge state as increased by 1 compared to the charge z of the first charge state, e.g. three subsequent charge states of the charges z, z+1 and z+2)

(ii) The full charge envelope contains two pairs of two subsequent charge states zslr (iii) When there is a gap between two accepted charge states zslr of a specific number $N_{gap}$ of charge states, only the charge state of the two charge states having a smaller difference to the charge state $z_1$ and all charge states between this charge state the charge state $z_1$ are taken into account for determining an improved score $s_{lr\_PL}(z_1)$ and autocorrelation value $R_{PL}(z_1)$, and then it is re-investigated according to the aforementioned rules, if the detected peak PL can be identified as a low resolution charge state with the charge $z_1$ with this improved score $s_{lr\_PL}(z_1)$. Typically, the number $N_{gap}$ of charge states not allowed in a gap is between 2 and 5.

In the described example of the preferred embodiment of the inventive method a detected peak PL is only then identified as low resolution charge state with the charge $z_1$, if the observed charge states of the full charge envelope of all charges 1, 2, . . . , $z_{limit}-1$, $z_{limit}$ of the accordingly mass assigned to the detected peak PL, if the peak originated by ions of the charge $z_1$, would fulfil the following further conditions, if only charge states zslr are accepted, for which a peak was found in its mass window.

(i) In the full charge envelope are 5 subsequent accepted charge states zslr (ii) The full charge envelope contains two times two subsequent accepted charge states zslr (iii) When there is a gap between two accepted charge states zslr of two charge states, only the charge state of the two charge states having a smaller difference to the charge state $z_1$ and all charge states between this charge states are taken into account for determining an improved score $s_{lr\_PL}(z_1)$ and autocorrelation value $R_{PL}(z_1)$, and then it is investigated according to the aforementioned rules, if the detected peak PL can be identified as low resolution charge state with the charge $z_1$ with this improved score $s_{lr\_PL}(z_1)$.

If in this preferred embodiment of the inventive method a detected peak PL is identified as a low resolution charge state with the charge $z_{hi}$, the isotope distributions deduced in step (iv) for all identified peaks of the charge envelope of the detected peak PL are no longer taken into account in the following steps of the inventive method. Then the monoisotopic mass or a parameter correlated to the mass of the isotopes of the isotope distribution is deduced from the detected peak PL as low resolution charge state with the charge $z_{hi}$ using a model for the unresolved isotope distribution of the peak like e.g. the averaging model.

So, in this preferred embodiment of the inventive method the monoisotopic mass or a parameter correlated to the mass of the isotopes of the isotope distribution cannot only be identified for species of molecules whose isotopes in an isotope distribution are resolved. Also from the unresolved isotope distributions of low resolution charge state identified with this preferred embodiment of the inventive method the monoisotopic mass or a parameter correlated to the mass of the isotopes of the isotope distribution can be identified for species of molecules. So, with this preferred embodiment of the inventive method more molecules contained or originated from a sample can be identified.

The method of this preferred embodiment of the inventive method to identify a detected peak PL of an isotope distribution as low resolution charge state with the charge $z_{hi}$ can be in general applied to any isotope distributions deduced with any described inventive method.

After isotope distributions of ions of species of molecules having a specific charge z are be deduced from a fraction of the at least one range of measured m/z values by parallel deducing with several processors of a multiprocessor, it is possible that two or more of the deduced isotope distributions are isotope distributions of ions of one species of molecules which have different specific charges z. Mostly these isotope distributions have been deduced in different fractions of the at least one range of measured m/z values. But these isotope distributions may also have been deduced one fraction of the at least one range of measured m/z values. It is also possible that one isotope distributions of ions of one species of molecules having a specific charge z has been identified when the isotope distributions are deduced from the fractions of the at least one range of measured m/z values and another isotope distributions of ions of the same species of molecules having another specific charge z' has not been deduced from the fractions of the at least one range of measured m/z values.

In general, different ions of one species of molecules which are detectable by a mass spectrometer can vary in the following manner:

(i) only the charge of the different ions is deviating and the mass is the same. These kind of ions may arise if electrons are added or removed by an ionization process.

Example: Addition of an Electron (Charge z=−1)

| | | |
|---|---|---|
| First ion: | mass m | charge z |
| Second ion: | mass m | charge z − 1 |

(ii) addition of ions with the mass $m_a$ and the charge $z_a$

Example: Addition of an Ion with the Mass $m_a$ and the Charge $z_a$

| | | |
|---|---|---|
| First ion: | mass m | charge z |
| Second ion: | mass m + $m_a$ | charge z + $z_a$ |

Typical adducts, which are added as ions, are $H^+$, $Na^+$, $K^+$ and ions of acetic acid and formic acid.

During electrospray ionization protons ($H^+$) having the mass m=1 and charge z=1 are added: Two resulting ions with or without an added proton are:

| | | |
|---|---|---|
| First ion: | mass m | charge z |
| Second ion: | mass m + 1 | charge z + 1 |

The possible occurrence of isotope distributions of ions of the same molecule having a different specific charge can be used in another step of the inventive method to improve the determination of the monoisotopic mass of the species of molecules.

At first from all isotope distributions of ions of species of molecules having a specific charge z are be deduced from a fraction of the at least one range of measured m/z values the isotope distribution of species of molecules M1 is defined for which the highest value of a charge score $cs_{M1}(z)$ was found when is isotope distribution was deducted from a fraction of the at least one range of measured m/z values. For this molecule M1 the isotope distributions of the ions with S charge scores $cs_{M1}(z_1) \ldots cs_{M1}(z_s)$ having the highest S values are investigated. Typically, the number of the investigated charge scores is between 2 and 8, preferably between 4 and 6. For each if this isotope distributions of the ions of the specific molecule having the specific charge z the neighboring isotope distributions of the ions of specific species of molecules having a charge which is between z−Δz and z+Δz are taken into account. A typical value of Δz is between 1 and 5, preferably it is 2 or 3. So, for Δz=2 the ions having the charge z−2, z−1, z, z+1, z+2 are taken into account. It has to be also taken into account that depending on the ionization process of the ions of the species of molecules also the mass of the ions can change as described above.

A new charge score $cs_{M1\_A}(z_X)$ of the isotope distributions of the ions with S charge scores $cs_{M1}(z_1) \ldots cs_{M1}(z_s)$ is calculated from their charge scores, e.g. by adding to the charge score the charge score of the neighboring isotope distributions taken into account.

For example:

$$cs_{M1\_A}(z_1)=cs_{M1}(z_1-\Delta z)+ \ldots +cs_{M1}(z_1)+ \ldots +cs_{M1}(z_1+\Delta z)$$

If the neighboring isotope distributions of the ions of specific species of molecules have been already deduced from a fraction of the at least one range of measured m/z values the evaluated charge scores of the deduced isotope distributions can be used. Otherwise from the m/z value $m_h/z_h$ of the highest peak of the investigated isotope distribution it is possible to conclude on the m/z values of the highest peak of the neighboring isotope distributions taken into account how different ions of one species of molecules can vary depending on their ionization as described above. E.g. for electrospray ionization the neighboring peak of the charge z+Δz has the m/z value $(m_h+\Delta z)/(z_h+\Delta z)$.

A search window for the highest peak of the neighboring isotope distribution having the theoretical m/z value $m/z_n$ is be defined by:

$$m/z_n-\delta m/z_{iso} \leq m/z \leq m/z_n+\delta m/z_{iso}$$

The window width $2^*\delta m/z_{iso}$ can be chosen depending on the charge of the neighboring isotope distribution and/or the maximum deviation of the mass of the observed and expected highest peak of the neighboring isotope distribution.

For this highest peak PN of the neighboring isotope distribution observed in the search window the other peaks of the isotope distribution have to be identified and a charge score $cs_{PN}(z_n)$ according to his charge $z_n$ has to be evaluated according to the methods described above to deduce isotope distributions in the fractions of the at least one range of measured m/z values. These charge scores $cs_{PN}(z_n)$ are then used in the calculation of the new charge scores $cs_{M1\_A}(z_x)$. The identification of the missing neighboring isotope distributions and evaluation of the charge score $cs_{PN}(z_n)$ can be done in parallel of different processors of a multiprocessor to accelerate the process.

If the new charge scores $cs_{M1\_A}(z_X)$ of the isotope distributions of the ions with the S charge scores $cs_{M1}(z_1) \ldots cs_{M1}(z_s)$ have been calculated, new charge scores $cs_{M1\_A}(z_X)$ are ranked. Then the charge score of the highest value $cs_{M1\_A}(z_{H1})$ of the charge state $z_{H1}$ is compared with the charge score of the second highest value $cs_{M1\_A}(z_{H2})$ of the charge state $z_{H2}$. If the ratio of these values is above a threshold $T_{cs2}$, the charge state $z_{H1}$ is accepted as the correct starting charge state of the species of molecules M1 to define the correct set of related isotope distributions of the species of molecules M1.

$$cs_{M1\_A}(z_{H1})/cs_{M1\_A}(z_{H2})>T_{cs2}$$

By the value of the threshold $T_{cs2}$ it can be defined how clearly the best two evaluated charge scores $cs_{M1\_A}(z_{H1})$ and $cs_{M1\_A}(z_{H1})$ having the highest values have to differ that the set of isotope distributions related to the starting charge state $z_{H1}$ can unambiguously deduced as set of the isotope distributions of the species of molecules M1. Typically, the value of the threshold $T_{cs2}$ is in the range of 1.10 and 3, preferably in the range of 1.15 and 2 and preferably in the range of 1.20 and 1.50. The value of the threshold $T_{cs2}$ can be set by the user, the controller or the producer of the controller by hardware or software.

From the deduced set of isotope distribution ions of the species of molecules M1 the monoisotopic mass of the species of molecules M1 and/or the monoisotopic peak of the species of molecules M1 can be deduced by methods known by a person skilled in the art e.g. by an averaging fit to the pattern of the peaks of the isotope distribution or looking directly for the monoisotopic peak in the isotope pattern of the isotope distribution.

After set of isotope distributions of the species of molecules M1 could be deduced the peaks of this set of isotope distributions are removed from all significant peaks in from the whole m/z range of the at least one range of measured m/z values.

Then from all remaining isotope distributions of ions of species of molecules having a specific charge z which be deduced from a fraction of the at least one range of measured m/z values whose significant peaks have not been removed the isotope distribution of the species of molecules M2 is defined for which the highest value of a charge score $cs_{M2}(z)$ was found when its isotope distribution was deducted from a fraction of the at least one range of measured m/z values. For this molecule M2 the isotope distributions of the ions with S charge scores $cs_{M2}(z_1) \ldots cs_{M2}(z_s)$ having the highest S values are investigated.

For this species of molecules M2 then in the same way as for the species of molecules peak M1 as set of the isotope distributions has to be deduced.

From the deduced set of isotope distribution ions of the species of molecules M2 the monoisotopic mass of the species of molecules M2 and/or the monoisotopic peak of the species of molecules M2 can be deduced by methods known by a person skilled in the art e.g. by an averaging fit to the pattern of the peaks of the isotope distribution or looking directly for the monoisotopic peak in the isotope pattern of the isotope distribution.

By repeating this procedure as often as possible as many sets as possible of isotope distributions of ions of species of molecules and also as many monoisotopic masses as possible of the species of molecules can be deduced.

To the content of this description of the invention belong also all embodiments which are combinations of the before mentioned embodiments of the invention. So, all embodiments are encompassed which comprise a combination of features described just for single embodiments before.

In all described embodiments, the Averaging model is used as the model of expected isotope distribution. It obvious for a person skilled in the art that he can also use other models of the expected isotope distribution according to the investigated molecules in the inventive method. So, also if the inventive method is using these models of expected isotope distribution, the inventive method is then encompassed by the scope and claims of this patent application.

The invention claimed is:

1. Method for identification of the monoisotopic mass or a parameter correlated to the mass of the isotopes of the isotope distribution of at least one species of molecules contained in a sample and/or originated from a sample by at least an ionization process comprising the following steps:

(i) measuring a mass spectrum of the sample with a mass spectrometer (ii) deducing for each of the at least one species of molecules contained in the sample and/or originated from the sample from the measured mass spectrum at least two isotope distributions of their ions having a specific charge z, (iii) deducing from the at least two deduced isotope distributions of the ions of each of the at least one species of molecules contained in the sample and/or originated from the sample the monoisotopic mass or a parameter correlated to the mass of the isotopes of the isotope distribution of the species of molecules, wherein charge scores $cs_{M1\_A}(z_X)$ are calculated for an isotope distribution having the specific charge $z_x$ of the at least one species M1 by adding charge scores of the neighboring isotope distributions of the ions of the species of molecules M1 having a charge between $z_x-\Delta z$ and $z_x+\Delta z$, wherein $\Delta z$ is between 1 and 5.

2. Method for identification of the monoisotopic mass or a parameter correlated to the mass of the isotopes of the isotope distribution of at least one species of molecules contained in a sample and/or originated from a sample by at least an ionization process according to claim 1, comprising the following further steps:

(iv) dividing at least one range of measured m/z values of the mass spectrum of the sample into fractions (v) assigning at least some of the fractions of the at least one range of measured m/z values to one processor of several provided processors and wherein the at least two deduced isotope distribution of the ions of each of the at least one species of molecules are deduced in at least one of the fractions of the at least one range of measured m/z values.

3. Method for identification of the monoisotopic mass or a parameter correlated to the mass of the isotopes of the isotope distribution of at least one species of molecules contained in a sample according and/or originated from a sample by at least an ionization process according to claim 2, wherein for some of the species of molecules contained in the sample and/or originated from the sample by at least an ionization process the monoisotopic mass or a parameter correlated to the mass of the isotopes of the isotope distribution is deduced from two or more isotope distributions of their ions having a different specific charge z which are deduced from different fractions of the at least one range of measured m/z values.

4. Method for identification of the monoisotopic mass or parameter correlated to the mass of the isotopes of the isotope distribution of at least one species of molecules contained in a sample and/or originated from a sample by at least an ionization process according to claim 1, wherein the monoisotopic mass or a parameter correlated to the mass of the isotopes of the isotope distribution of each of the at least one species of molecules contained in the sample and/or originated from the sample by at least an ionization process is deduced from at least two deducted isotope distribution of their ions having a specific charge z by evaluating the at least two isotope distributions of ions having a specific charge z.

5. Method for identification of the monoisotopic mass or a parameter correlated to the mass of the isotopes of the isotope distribution of at least one species of molecules contained in a sample and/or originated from a sample by at least an ionization process according to claim 1, wherein for each of the at least one species of molecules contained in the sample and/or originated from the sample by at least an ionization process from the measured mass spectrum the at least two isotope distribution of their ions having a specific charge z are deduced by deducing a charge score $cs_{PX}(z)$ of measured peaks PX of the mass spectrum.

6. Method for identification of the monoisotopic mass or a parameter correlated to the mass of the isotopes of the isotope distribution of at least one species of molecules contained in a sample and/or originated from a sample by at least an ionization process according to claim 5, wherein for each of the at least one species of molecules contained in the sample and/or originated from the sample by at least an ionization process from the measured mass spectrum at least two isotope distributions of their ions having a specific charge z are deduced by deducing for each charge state z between the charge 1 and a maximum charge state $z_{max}$ the charge score $cs_{PX}(z)$ of the measured peaks PX of the mass spectrum.

7. Method for identification of the monoisotopic mass or a parameter correlated to the mass of the isotopes of the isotope distribution of at least one species of molecules contained in a sample and/or originated from a sample by at least an ionization process according to claim 6, wherein the deduced charge scores $cs_{PX}(z)$ of the measured peaks PX are ranked.

8. Method for identification of the monoisotopic mass or a parameter correlated to the mass of the isotopes of the isotope distribution of at least one species of molecules contained in a sample and/or originated from a sample by at least an ionization process according to claim 7, wherein the deduced charge score of the highest value $cs_{PX}(z_1)$ of the measured peaks PX and the deduced charge score of the second highest value $cs_{PX}(z_2)$ of the measured peaks PX are compared.

9. Method for identification of the monoisotopic mass or a parameter correlated to the mass of the isotopes of the isotope distribution of at least one species of molecules contained in a sample and/or originated from a sample by at least an ionization process according to claim 1, wherein after the deduction of isotope distributions in step (ii) at least a portion of the deduced isotope distributions are investigated if one or more of their peaks might belong to an isotope distribution of a low resolution charge state $z_{hi}$.

10. Method for identification of the monoisotopic mass or a parameter correlated to the mass of the isotopes of the isotope distribution of at least one species of molecules contained in a sample and/or originated from a sample by at least an ionization process according to claim 1, wherein after the deduction of isotope distributions in step (ii) at least a portion of the deduced isotope distributions are investigated if one or more of their peaks might belong to an isotope distribution of a low resolution charge state $z_{hi}$ and the monoisotopic mass or a parameter correlated to the mass of the isotopes of these isotope distributions of at species of molecules contained in a sample and/or originated from a sample by at least an ionization process is deduced from the isotope distribution of low resolution charge state $z_{hi}$, assigned by the investigation to a peak of a isotope distribution deduced in step (ii).

11. Method for identification of the monoisotopic mass or a parameter correlated to the mass of the isotopes of the isotope distribution of at least one species of molecules contained in a sample and/or originated from a sample by at least an ionization process according to claim 1, wherein the charge scores csM1_A(zX) are calculated by adding to a charge score of the isotope distribution of the at least one species M1 charge scores of the neighboring isotope distributions taking into account.

12. Method for identification of the monoisotopic mass or a parameter correlated to the mass of the isotopes of the isotope distribution of at least one species of molecules contained in a sample and/or originated from a sample by at least an ionization process according to claim 1, wherein the charge scores csM1_A(zX) of the at least one species M1 are calculated for the isotope distributions of the ions with S charge scores csM1(z1) . . . csM1(zs) having the highest S values.

13. Method for identification of the monoisotopic mass or a parameter correlated to the mass of the isotopes of the isotope distribution of at least one species of molecules contained in a sample and/or originated from a sample by at least an ionization process according to claim 12, wherein the calculated charge scores $cs_{M1\_A}(z_X)$ are ranked and the charge score of the highest value $cs_{M1\_A}(z_{H1})$ of the charge state $z_{H1}$ is compared with the charge score of the second highest value $cs_{M1\_A}(z_{H2})$ of the charge state $z_{H2}$.

14. Method for identification of the monoisotopic mass or a parameter correlated to the mass of the isotopes of the isotope distribution of at least one species of molecules contained in a sample and/or originated from a sample by at least an ionization process according to claim 1, wherein $\Delta z$ is 2 or 3.

* * * * *